(12) United States Patent
Costello et al.

(10) Patent No.: US 7,790,312 B2
(45) Date of Patent: *Sep. 7, 2010

(54) ELECTROLYTE COMPOSITION

(75) Inventors: Michael G. Costello, Afton, MN (US); Richard M. Flynn, Mahtomedi, MN (US); Haruki Segawa, Sagimhara (JP)

(73) Assignee: 3M Innovative Properties Company, St. Paul, MN (US)

( * ) Notice: Subject to any disclaimer, the term of this patent is extended or adjusted under 35 U.S.C. 154(b) by 1078 days.

This patent is subject to a terminal disclaimer.

(21) Appl. No.: 11/381,862

(22) Filed: May 5, 2006

(65) Prior Publication Data

US 2007/0054186 A1 Mar. 8, 2007

Related U.S. Application Data

(60) Provisional application No. 60/715,291, filed on Sep. 8, 2005.

(51) Int. Cl.
*H01M 6/04* (2006.01)

(52) U.S. Cl. .................. 429/188; 429/200; 429/326; 429/330; 429/341

(58) Field of Classification Search .................. 429/188, 429/200, 326, 330, 341
See application file for complete search history.

(56) References Cited

U.S. PATENT DOCUMENTS

| | | | |
|---|---|---|---|
| 3,351,495 | A | 11/1967 | Larsen et al. |
| 3,962,348 | A | 6/1976 | Benninger et al. |
| 4,539,256 | A | 9/1985 | Shipman |
| 4,731,304 | A | 3/1988 | Lundquist et al. |
| 5,539,008 | A | 7/1996 | Dams et al. |
| 5,565,281 | A | 10/1996 | Yu et al. |
| 5,916,708 | A | 6/1999 | Besenhard et al. |
| 6,080,448 | A | 6/2000 | Leiner et al. |
| 6,203,944 | B1 | 3/2001 | Turner et al. |
| 6,255,017 | B1 | 7/2001 | Turner |
| 6,342,098 | B1 | 1/2002 | Leiner et al. |
| 6,399,729 | B1 | 6/2002 | Farnham et al. |
| 6,436,578 | B2 | 8/2002 | Turner et al. |

(Continued)

FOREIGN PATENT DOCUMENTS

EP 0 482 938 B1 4/1996

(Continued)

OTHER PUBLICATIONS

Nakajima, "Fluorine-containing energy conversion materials", *Journal of Fluorine Chemistry* 105 (2000), pp. 229-238.

(Continued)

*Primary Examiner*—Jane Rhee
(74) *Attorney, Agent, or Firm*—Kent S. Kokko

(57) ABSTRACT

An electrolyte composition includes (a) a solvent composition including at least one hydrofluoroether compound, the hydrofluoroether compound including two terminal fluoroalkyl groups and an intervening substituted or unsubstituted oxymethylene group, each of the fluoroalkyl groups including only one hydrogen atom and, optionally, at least one catenated (that is, in-chain) heteroatom, with the proviso that, when the oxymethylene group is unsubstituted, at least one of the terminal fluoroalkyl groups is branched and/or includes at least one catenated heteroatom; and (b) at least one electrolyte salt.

47 Claims, 3 Drawing Sheets

U.S. PATENT DOCUMENTS

| | | | |
|---|---|---|---|
| 6,534,220 | B2 | 3/2003 | Garbe |
| 6,680,145 | B2 | 1/2004 | Obrovac et al. |
| 6,699,336 | B2 | 3/2004 | Turner et al. |
| 6,759,374 | B2 | 7/2004 | Milbrath et al. |
| 7,229,718 | B2 | 6/2007 | Yamaguchi et al. |
| 7,498,100 | B2 | 3/2009 | Christensen et al. |
| 2003/0134757 | A1 | 7/2003 | Milbrath et al. |
| 2003/0211390 | A1 | 11/2003 | Dahn et al. |
| 2004/0038133 | A1 | 2/2004 | Yamaguchi et al. |
| 2004/0117918 | A1 | 6/2004 | Scheper et al. |
| 2005/0031957 | A1 | 2/2005 | Christensen et al. |
| 2005/0127322 | A1 | 6/2005 | Costello et al. |
| 2006/0046144 | A1 | 3/2006 | Obrovac |
| 2007/0054186 | A1 | 3/2007 | Costello et al. |

FOREIGN PATENT DOCUMENTS

| | | |
|---|---|---|
| EP | 0 807 986 A1 | 11/1997 |
| EP | 1 039 570 A1 | 9/2000 |
| JP | 07-249432 | 9/1995 |
| JP | 2002-201152 | 7/2002 |
| JP | 2004-345967 | 12/2004 |
| JP | 2004-363031 | 12/2004 |
| WO | WO 84/02909 | 8/1984 |
| WO | WO 00/03444 | 1/2000 |
| WO | WO 02/102858 A1 | 12/2002 |
| WO | WO 2005/096411 | 10/2005 |
| WO | WO 2006/084096 | 8/2006 |

OTHER PUBLICATIONS

Nakajima et al., "Effect of addition of fluoroethers to organic solvents for lithium ion secondary batteries", *Journal of Fluorine Chemistry* 111 (2001), pp. 167-174.

Gavelin et al., "Amphiphilic solid polymer electrolytes", *Solid State Ionics* 147 (2002), pp. 325-332.

Kyokane et al., "Electrical properties of fluorinated gel electrolytes using high ionic conducting solution and its application to secondary battery", *Thin Solid Films* 438-439 (2003), pp. 257-261.

Balakrishnan et al., "Safety mechanisms in lithium-ion batteries", *Journel of Power Sources* 155 (2006), pp. 401-414.

Costa et al., "A Comparative Study on Some Fluoroalcohols as Potential Solvents for Aliphatic Polyamides", *J. Macromol. Sci.-Chem.*, A18 (2), pp. 299-312 (1982).

Davies, "Metallic glass formation", *Amorphous Metallic Alloys*, Chapter 2, pp. 8-25, F. E. Luborsky, ed., Butterworth & Co., 1983.

Chi et al., "A Facile Synthesis of Partly-fluorinated Ethers Using Perfluoropropoxyethylene and Aliphatic Alcohols", *Bull. Korean Chem. Soc.*, vol. 20, No. 2, 1999, pp. 220-222.

Chambers et al., "Free Radical Chemistry, Part 3.1 Substituent Effects in Additions of Ethers to Fluorinated Alkenes", *J. Chem. Soc.*, Perkin Trans. 1, 1985, p. 2209-2213.

Chambers et al., *Israel Journal of Chemistry* (1999), 39(2), 133-140 (abstract from STN search).

Arai, "Nonflammable Methyl Nonafluorobutyl Ether for Electrolyte Used in Lithium Secondary Batteries", *Journal of the Electrochemical Society*, 150 (2), A219-A228 (2003).

Il'in et al., "Synthesis and Use of Partially Fluorinated Dialkyl Ethers Derived from Hexafluoropropylene", *Russian Journal of Applied Chemistry*, vol. 77, No. 1, 2004, pp. 98-101.

Muramatsu et al., "The Addition Reaction of Fluoroalkyl Ehtyl Ethers to Perfluoropropene", *Bulletin of the Chemical Society of Japan*, vol. 42, pp. 1155-1158 (1969).

Abstract, Ilyin et al., "The use of tetrafluoroethylene and hexafluoropropylene in the synthesis of partly fluorinated alcohols and dialkyl ethers", Fluorine Notes (2003), 30 Paper No. 1.

ACS Registry (Registry No. 24556-39-6), 1,1,1,2,3,3-hexafluoro-4-(1,1,2,2-tetrafluoroethoxy)-pentane, Nov. 16, 1984.

ACS Registry (Registry No. 16627-71-7), 1,1,2,2,3,3,4,4-octafluoro-5-(1,1,2,2-tetrafluoroethoxy)-pentane, Nov. 16, 1984.

ACS Registry (Registry No. 16627-68-2), 1,1,2,2-tetrafluoro-3-(1,1,2,2-tetrafluoroethoxy)-pentane, Nov. 16, 1984.

ically solids at room temperature. Sulfones such as tetramethylene sulfone (sulfolane) and ethyl methyl sulfone, however, have been used as electrolyte solvents. Dimethylsulfone has also been utilized, but, with a melting point of 107° C., its utility has been limited to batteries that operate at elevated temperatures (that is, at temperatures above which the electrolyte composition can be maintained in the liquid state).

ELECTROLYTE COMPOSITION

STATEMENT OF PRIORITY

This application claims the priority of U.S. Provisional Application No. 60/715,291 filed Sep. 8, 2005, the contents of which are hereby incorporated by reference.

FIELD

This invention relates to electrolyte compositions comprising at least one partially-fluorinated compound and at least one electrolyte salt. In other aspects, this invention also relates to electrochemical devices comprising the electrolyte compositions and to articles comprising the electrochemical devices.

BACKGROUND

The rapid development of electronic devices has increased market demand for electrochemical devices such as fuel cells, capacitors, electrochromic windows, and battery systems. In response to the demand for battery systems in particular, practical rechargeable lithium batteries have been actively researched. These systems are typically based on the use of lithium metal, lithiated carbon, or a lithium alloy as the negative electrode (anode).

Lithium batteries are prepared from one or more lithium electrochemical cells. Such cells have consisted of a nonaqueous lithium ion-conducting electrolyte composition interposed between electrically-separated, spaced-apart positive and negative electrodes. The electrolyte composition is typically a liquid solution of lithium electrolyte salt in nonaqueous aprotic organic electrolyte solvent (often a solvent mixture).

The selection of electrolyte solvents for rechargeable lithium batteries is crucial for optimal battery performance and involves a variety of different factors. However, long-term stability, ionic conductivity, safety, and wetting capability tend to be the most important selection factors in high volume commercial applications.

Long-term stability requires that an electrolyte solvent be intrinsically stable over the battery's range of operating temperatures and voltages and also that it be either unreactive with electrode materials or that it effectively form a passivating film with good ionic conductivity. Ionic conductivity requires an electrolyte solvent that effectively dissolves lithium electrolyte salts and facilitates lithium ion mobility. From the viewpoint of safety, the characteristics of low volatility, low flammability, low combustibility, and low toxicity are all highly desirable. It is also desirable that the battery's electrodes and separator be quickly and thoroughly wetted by the electrolyte solvent, so as to facilitate rapid battery manufacturing and optimize battery performance.

Aprotic liquid organic compounds have been the most commonly used electrolyte solvents for lithium batteries. Often, compounds such as ethers or carbonic acid esters (carbonates) have been utilized, as these compounds typically share the desirable properties of oxidative stability at positive electrodes operating at less than about 4.4V vs. Li$^+$/Li, low reactivity with lithium-containing negative electrodes, and a thermodynamically favorable interaction with lithium ions (which is manifested in the electrolyte composition as a high degree of dissociation of the anion and the lithium cation of the electrolyte salt).

The most commonly used aprotic organic electrolyte solvents for use in lithium batteries include cyclic esters (for example, ethylene carbonate, propylene carbonate, γ-butyrolactone), linear esters, cyclic ethers (for example, 2-methyltetrahydrofuran, 1,3-dioxolane), linear ethers (for example, 1,2-dimethoxyethane), amides, and sulfoxides. A mixed solvent is sometimes preferred, since the properties of the electrolyte composition (conductance, viscosity, etc.) and its reactivity towards lithium can often be 'tailored' to give optimum performance.

Less traditional solvents such as carboxylic acid esters, sulfoxides, sulfones, and sulfonamides have been used as electrolyte solvents with varying success. Sulfones are typically solids at room temperature. Sulfones such as tetramethylene sulfone (sulfolane) and ethyl methyl sulfone, however, have been used as electrolyte solvents. Dimethylsulfone has also been utilized, but, with a melting point of 107° C., its utility has been limited to batteries that operate at elevated temperatures (that is, at temperatures above which the electrolyte composition can be maintained in the liquid state).

Drawbacks to the use of conventional lithium battery electrolyte solvents are generally related to their low boiling points and high flammabilities or combustibilities. Some solvents, such as the cyclic carbonates ethylene carbonate and propylene carbonate, have boiling points above 200° C. However, many electrolyte solvents have boiling points that are substantially lower and have flash points less than 100° F. Such volatile solvents can ignite during catastrophic failure of a fully or partially charged battery that has undergone, for example, a rapid discharge due to a short circuit. Additionally, volatile solvents present difficulties in the preparation and storage of electrolyte compositions as well as in addition of the composition to the battery during the manufacturing process. Another common problem of some conventional electrolyte solvents is that they often have a surface energy that is too high to spontaneously wet the battery components.

SUMMARY

Thus, we recognize that there remains a need in the art for electrolyte solvents that have reduced volatility, flammability, and combustibility (relative to conventional solvents), yet effectively dissolve electrolyte salts to form stable electrolyte compositions that adequately wet electrochemical device components and that exhibit adequate ionic conductivities over a range of operating temperatures.

Briefly, in one aspect, this invention provides an electrolyte composition including a partially-fluorinated ether compound. The electrolyte composition includes (a) a solvent composition including at least one hydrofluoroether compound including two terminal fluoroalkyl groups and an intervening substituted or unsubstituted oxymethylene group, each of the fluoroalkyl groups including only one hydrogen atom and, optionally, at least one catenated (that is, in-chain) heteroatom, with the proviso that, when the oxymethylene group of the hydrofluoroether compound is unsubstituted (that is, neither carbon-bonded hydrogen atom is replaced with an alkyl or fluoroalkyl group that optionally contains at least one catenated heteroatom), at least one of the terminal fluoroalkyl groups is branched and/or comprises at least one catenated heteroatom; and (b) at least one electrolyte salt.

The electrolyte salt is preferably a lithium salt including a fluorine-containing anion. It has been discovered that at least some of the above-described novel hydrofluoroether compounds have surprisingly high boiling points and low volatilities and thus, in general, are less flammable or less combustible than conventional electrolyte solvents. Yet solvent compositions including the compounds quite effectively dissolve electrolyte salts to provide electrolyte compositions that adequately wet electrochemical device components (such as separators) and that exhibit adequate ionic conductivities for use in electrochemical devices over a range of operating temperatures (for example, from about 20° C. to about 80° C. or even higher, depending upon the power requirements for a particular application). The solvent compositions (and electrolyte compositions including the solvent compositions) also can present fewer difficulties in storage and handling than do some conventional materials, due to the lower volatility, flammability, and/or combustibility of the hydrofluoroether compounds.

At least some of the hydrofluoroether compounds are particularly well-suited for use in high-temperature batteries (batteries that are designed to function at temperatures above, for example, about 60° C.). In such batteries, electrolyte compositions including the compounds can exhibit adequate conductivities, while being less likely to ignite during catastrophic battery failure than some conventional electrolyte compositions.

Thus, at least some solvent compositions including the hydrofluoroether compounds meet the need in the art for electrolyte solvents that have reduced volatility, flammability, and combustibility (relative to conventional solvents), yet effectively dissolve electrolyte salts to form stable electrolyte compositions that adequately wet electrochemical device components and that exhibit adequate ionic conductivities over a range of operating temperatures.

In other aspects, this invention also provides electrochemical devices (preferably, batteries) including the electrolyte compositions; and articles including the electrochemical devices.

BRIEF DESCRIPTION OF THE DRAWINGS

The invention may be more completely understood in consideration of the following detailed description of various embodiments of the invention in connection with the accompanying drawings, in which.

DETAILED DESCRIPTION

Definitions

Figure 1:
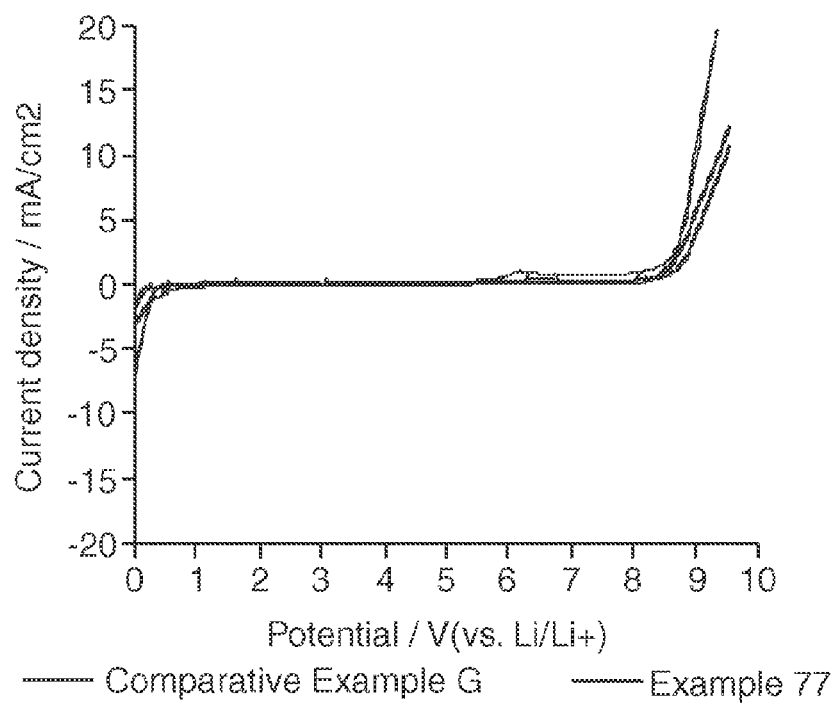
FIG. 1 is a voltammogram for Example 77 and Comparative Example G.

The following provides definitions of some of the terms used in this patent application:

"addition-capable" (in regard to a fluorocarbon alcohol) means an alcohol in which the carbon-bonded fluorine is sufficiently distant from the hydroxyl group to enable the addition reaction with starting compound to occur;

"catenated heteroatom" means an atom other than carbon (for example, oxygen, nitrogen, or sulfur) that is bonded to carbon atoms in a carbon chain so as to form a carbon-heteroatom-carbon chain;

"fluoro-" (for example, in reference to a group or moiety, such as in the case of "fluoroalkylene" or "fluoroalkyl" or "fluorocarbon") or "fluorinated" means only partially fluorinated such that there is at least one carbon-bonded hydrogen atom;

"monofunctional" or "polyfunctional" (in regard to an alcohol) means that the alcohol contains only one hydroxyl group or at least two hydroxyl groups, respectively;

"normally liquid" means liquid under ambient conditions of temperature and pressure (for example, at about 20° C. and about 1 atmosphere);

"perfluoro-" (for example, in reference to a group or moiety, such as in the case of "perfluoroalkylene" or "perfluoroalkyl" or "perfluorocarbon") or "perfluorinated" means completely fluorinated such that, except as may be otherwise indicated, there are no carbon-bonded hydrogen atoms replaceable with fluorine; and "substituted" (in reference to a group or moiety) means that at least one carbon-bonded hydrogen atom is replaced with an alkyl or fluoroalkyl group that optionally contains one or more catenated heteroatoms.

Hydrofluoroether Compounds

The compounds used in the electrolyte composition of the invention include two terminal fluoroalkyl groups and an intervening substituted or unsubstituted oxymethylene group ($—CR_1R_2—O—$, wherein $R_1$ and $R_2$ are independently hydrogen or a substituent group defined below), each of the fluoroalkyl groups including only one hydrogen atom (for example, as part of a monofluoromethylene or difluoromethyl moiety) and, optionally, including at least one catenated (that is, in-chain) heteroatom, with the proviso that, when the oxymethylene group of the hydrofluoroether compound is unsubstituted (that is, neither carbon-bonded hydrogen atom is replaced with an alkyl or fluoroalkyl group that optionally contains at least one catenated heteroatom), at least one of the terminal fluoroalkyl groups is branched or comprises at least one catenated heteroatom or is both branched and comprises at least one catenated heteroatom. The hydrogen atom of the fluoroalkyl groups is preferably part of a monofluoromethylene moiety.

A class of the compounds is that which can be represented by the following general formula (I):

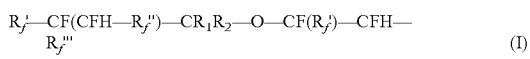
(I)

wherein each $R_f'$ and $R_f'''$ are independently a fluorine atom or a perfluoroalkyl group that is linear, branched, cyclic, or a combination thereof and that optionally contains at least one catenated heteroatom; each $R_f''$ is independently a perfluoroalkyl group that is linear, branched, cyclic, or a combination thereof and that optionally contains at least one catenated heteroatom; and $R_1$ and $R_2$ are independently a hydrogen atom, an alkyl group that is linear, branched, cyclic, or a combination thereof and that optionally contains at least one catenated heteroatom, or a fluoroalkyl group that is linear, branched, cyclic, or a combination thereof and that optionally contains at least one catenated heteroatom. Preferably, $R_1$ is hydrogen or an alkyl group that is linear, branched, cyclic, or a combination thereof, and $R_2$ is hydrogen or an alkyl group that is linear, branched, cyclic, or a combination thereof, or is a moiety that can be represented by the formula $—(CR_1R_3)_n—O—CF(R_f')—CFH—R_f''$, where $R_3$ is hydrogen or an alkyl group that is linear, branched, cyclic, or a combination thereof, or is a moiety that can be represented by the formula $—CF(R_f')—CFH—R_f''$, and n is an integer of 1 to about 8. More preferably, $R_1$ is hydrogen or an alkyl group that is linear, branched, cyclic, or a combination thereof; and $R_2$ is an alkyl group that is linear, branched, cyclic, or a combination thereof. Most preferably, $R_1$ is hydrogen or an alkyl group having up to about three carbon atoms (preferably, the alkyl group is a methyl group), and $R_2$ is an alkyl group having up to about three carbon atoms (preferably, a methyl group). Preferably, each $R_f'$ is independently fluorine or $C_3F_7$— (more preferably, fluorine); each $R_f''$ is independently selected from $C_3F_7O$—, $C_4F_9O$—, $C_3F_7OC_3F_6O$—, $CF_3OC_3F_6O$—, and $CF_3$— (more preferably, $CF_3$—); and $R_f'''$ is fluorine or is selected from $C_3F_7O$—, $C_4F_9O$—, $C_3F_7OC_3F_6O$—, $CF_3OC_3F_6O$—, and $CF_3$— (more preferably, $R_f'''$ is $C_3F_7O$—, $C_4F_9O$—, $C_3F_7OC_3F_6O$—, $CF_3OC_3F_6O$—, or $CF_3$—).

Another class of the compounds is that which can be represented by the following general formula (II):

$$H(CF_2)_p\text{—}CR_1R_2\text{—}O\text{—}CF(R_f')\text{—}CFH\text{—}R_f' \qquad (II)$$

wherein p is an integer of 2 to about 10; and $R_1$, $R_2$, and $R_f'$ are as defined above for formula (I).

Representative examples of the hydrofluoroether compounds include the following:
$CF_3CFHCF_2CH_2OCF_2CFHOC_3F_7$,
$CF_3CFHCF_2CH_2OCF_2CFHOC_3F_6OCF_3$,
$CF_3CFHCF_2CH_2OCF_2CFHOCF_3$,
$CF_3CFHCF_2CH_2OCF_2CFHOCF_2CF(CF_3)OC_3F_7$,
$CF_3CFHCF_2CH_2OCF_2CFHOC_4F_9$,
$CF_3CFHCF_2CH_2OCF_2CFHC_3F_7$, $CF_3CF(CH_2OCF_2CFHCF_3)CFHCF(CF_3)_2$, $CF_3CFHCF(CH_2OCF_2CFHCF_3)CF(CF_3)_2$, $CF_3CF(CH_2OCF_2CFHCF_3)CFHCF_2CF_3$, $CF_3CF_2CF(CH_2OCF_2CFHCF_3)CFHCF_3$, $CF_3CFHCF_2CH_2OCF(CF_3)CFHC_2F_5$,
$CF_3CFHCF_2CH(CH_3)OCF_2CFHCF_3$, $CF_3CFHCF_2CH(CH_3)OCF_2CFHOC_3F_7$, $CF_3CFHCF_2CH(CH_3)OCF_2CFHOC_3F_6OCF_3$, $CF_3CFHCF_2CH(CH_3)OCF_2CFHOCF_3$, $CF_3CFHCF_2CH(CH_3)OCF_2CFHOCF_2CF(CF_3)OC_3F_7$, $CF_3CFHCF_2CH(CH_3)OCF_2CFHOC_4F_9$, $CF_3CFHCF_2CH(CH_3)OCF_2CFHC_3F_7$, $CF_3CF[CH(CH_3)OCF_2CFHCF_3]CFHCF(CF_3)_2$, $CF_3CFH[CH(CH_3)OCF_2CFHCF_3]CFCF(CF_3)_2$, $CF_3CF[CH(CH_3)OCF_2CFHCF_3]CFHCF_2CF_3$, $CF_3CF_2CF[CH(CH_3)OCF_2CFHCF_3]CFHCF_3$, $CF_3CFHCF_2CH(CH_3)OCF(CF_3)CFHC_2F_5$, $CF_3CFHCF_2C(CH_3)_2OCF_2CFHCF_3$, $CF_3CFHCF_2C(CH_3)_2OCF_2CFHOC_3F_7$, $CF_3CFHCF_2C(CH_3)_2OCF_2CFHOC_3F_6OCF_3$, $CF_3CFHCF_2C(CH_3)_2OCF_2CFHOCF_3$, $CF_3CFHCF_2C(CH_3)_2OCF_2CFHOCF_2CF(CF_3)OC_3F_7$, $CF_3CFHCF_2C(CH_3)_2OCF_2CFHOC_4F_9$, $CF_3CFHCF_2C(CH_3)_2OCF_2CFHC_3F_7$, $CF_3CF[C(CH_3)_2OCF_2CFHCF_3]CFHCF_2CF_3$, $CF_3CF_2CF[C(CH_3)_2OCF_2CFHCF_3]CFHCF_3$, $C_3F_7OCFHCF_2CH_2OCF_2CFHCF_3$,
$C_3F_7OCFHCF_2CH_2OCF_2CFHOC_3F_7$,
$C_3F_7OCFHCF_2CH_2OCF_2CFHOC_3F_6OCF_3$,
$C_3F_7OCFHCF_2CH_2OCF_2CFHOCF_3$,
$C_3F_7OCFHCF_2CH_2OCF_2CFHOCF_2CF(CF_3)OC_3F_7$,
$C_3F_7OCFHCF_2CH_2OCF_2CFHOC_4F_9$,
$C_3F_7OCFHCF_2CH_2OCF_2CFHC_3F_7$, $CF_3CF(CH_2OCF_2CFHOC_3F_7)CFHCF(CF_3)_2$, $CF_3CF(CH_2OCF_2CFHOC_3F_7)CFHCF_2CF_3$, $CF_3CF_2CF(CH_2OCF_2CFHOC_3F_7)CFHCF_3$,
$C_3F_7OCFHCF_2CH(CH_3)OCF_2CFHCF_3$,
$C_3F_7OCFHCF_2CH(CH_3)OCF_2CFHOC_3F_7$,
$C_3F_7OCFHCF_2CH(CH_3)OCF_2CFHOC_3F_6OCF_3$,
$C_3F_7OCFHCF_2CH(CH_3)OCF_2CFHOCF_3$,
$C_3F_7OCFHCF_2CH(CH_3)OCF_2CFHOCF_2CF(CF_3)OC_3F_7$, $C_3F_7OCFHCF_2CH(CH_3)OCF_2CFHOC_4F_9$, $C_3F_7OCFHCF_2CH(CH_3)OCF_2CFHC_3F_7$, $CF_3CF(CH(CH_3)OCF_2CFHOC_3F_7)CFHCF(CF_3)_2$, $CF_3CF(CH(CH_3)OCF_2CFHOC_3F_7)CFHCF_2CF_3$, $CF_3CF_2CF(CH(CH_3)OCF_2CFHOC_3F_7)CFHCF_3$,
$C_3F_7OCFHCF_2C(CH_3)_2OCF_2CFHCF_3$, $C_3F_7OCFHCF_2C(CH_3)_2OCF_2CFHOC_3F_7$, $C_3F_7OCFHCF_2C(CH_3)_2OCF_2CFHOC_3F_6OCF_3$, $C_3F_7OCFHCF_2C(CH_3)_2OCF_2CFHOCF_3$, $C_3F_7OCFHCF_2C(CH_3)_2OCF_2CFHOCF_2CF(CF_3)OC_3F_7$, $C_3F_7OCFHCF_2C(CH_3)_2OCF_2CFHOC_4F_9$, $C_3F_7OCFHCF_2C(CH_3)_2OCF_2CFHC_3F_7$, $CF_3CF(C(CH_3)_2OCF_2CFHOC_3F_7)CFHCF(CF_3)_2$, $CF_3CF(C(CH_3)_2OCF_2CFHOC_3F_7)CFHCF_2CF_3$, $CF_3CF_2CF(C(CH_3)_2OCF_2CFHOC_3F_7)CFHCF_3$,
$CF_3CFHCF_2CH(OCF_2CFHCF_3)CH_2OCF_2CFHCF_3$,
$CF_3OCF(CF_3)CF_2OCFHCF_2C(CH_3)_2OCF_2CFHCF_3$,
$[CF_3CFHCF_2OCH(CF_2CFHCF_3)]_2CH_2$,
$CF_3CFHCF_2OCH_2CH_2CH(CF_2CFHCF_3)OCF_2CFHCF_3$,
$C_4F_9CH_2CH(CF_2CFHCF_3)OCF_2CFHCF_3$, $CH_3C(OCF_2CFHCF_3)(CF_2CFHCF_3)CH_2OCF_2CFHCF_3$,
$CH_3CH(OCF_2CFHCF_3)CH(OCF_2CFHCF_3)CF_2CFHCF_3$,

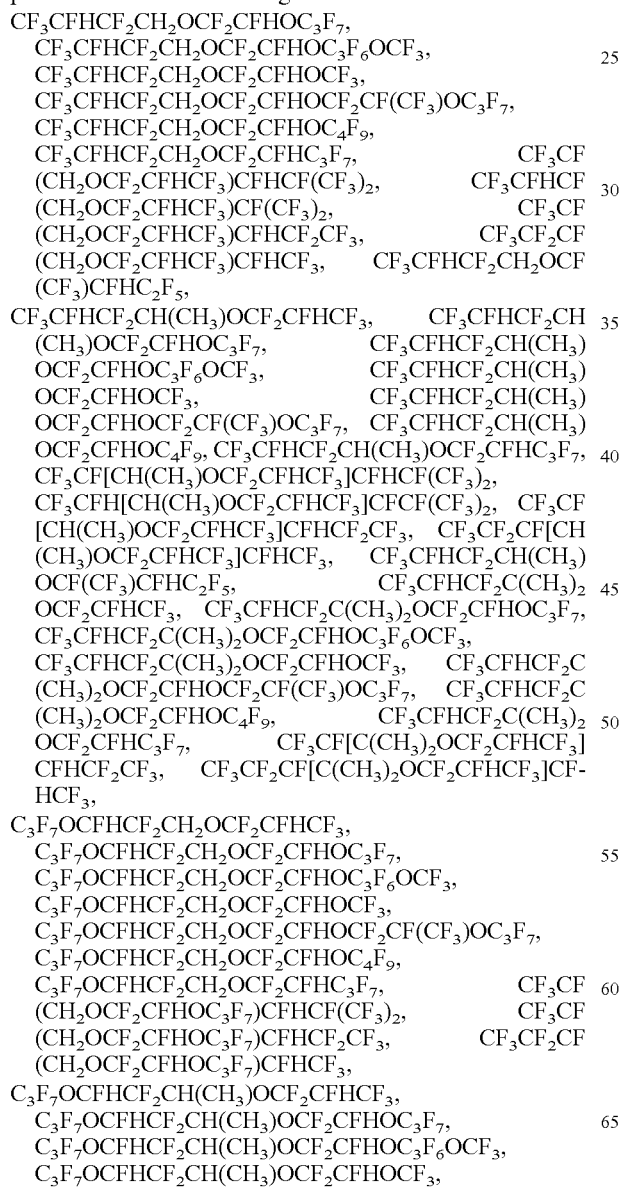

$CF_3CFHCF_2CH(CH_3)OCF_2CF_2H$, $HC_2F_4CH(CH_3)OCF_2CFHCF_3$, and the like, and mixtures thereof.

Preferred hydrofluoroether compounds include $CF_3CFHCF_2CH(CH_3)OCF_2CFHCF_3$, $CF_3CFHCF_2CH_2OCF_2CFHOC_4F_9$, $C_3F_7OCFHCF_2CH(CH_3)OCF_2CFHCF_3$, $CF_3CFH[CH(CH_3)OCF_2CFHCF_3]CFCF(CF_3)_2$, $CF_3CFHCF_2CH(OCF_2CFHCF_3)CH_2OCF_2CFHCF_3$, $CF_3CFHCF_2CH_2OCF_2CFHOC_3F_7$, $CF_3CFHCF_2CH_2OCF_2CFHOCF_3$, $CF_3CF(CH_2OCF_2CFHCF_3)CFHCF(CF_3)_2$, $CF_3CFHCF(CH_2OCF_2CFHCF_3)CF(CF_3)_2$, $CF_3CFHCF_2CH(CH_3)OCF_2CFHOC_3F_7$, $CF_3CF[CH(CH_3)OCF_2CFHCF_3]CFHCF(CF_3)_2$, $CF_3CF[CH(CH_3)OCF_2CFHCF_3]CFHCF_2CF_3$, $CF_3CF_2CF[CH(CH_3)OCF_2CFHCF_3]CFHCF_3$, $CF_3CFHCF_2C(CH_3)_2OCF_2CFHCF_3$, $CF_3CFHCF_2C(CH_3)_2OCF_2CFHOC_3F_7$, $C_3F_7OCFHCF_2CH_2OCF_2CFHCF_3$, $CF_3OCF(CF_3)CF_2OCFHCF_2C(CH_3)_2OCF_2CFHCF_3$, $CF_3CFHCF_2OCH_2CH_2CH(CF_2CFHCF_3)OCF_2CFHCF_3$, and mixtures thereof, with $CF_3CFHCF_2CH(CH_3)OCF_2CFHCF_3$, $CF_3CFH[CH(CH_3)OCF_2CFHCF_3]CFCF(CF_3)_2$, $CF_3CF[CH(CH_3)OCF_2CFHCF_3]CFHCF_2CF_3$, $CF_3CFHCF_2CH(OCF_2CFHCF_3)CH_2OCF_2CFHCF_3$, and mixtures thereof being more preferred.

The hydrofluoroether compounds are hydrophobic and less oleophobic than their perfluoroether analogs, relatively chemically unreactive, thermally stable, water insoluble, and normally liquid (for example, at 20° C.), and they can be made in high yield, high purity, and with a wide range of molecular weights. Their covalent carbon-hydrogen bonds are generally degradable by atmospheric photo-oxidation, thus making the compounds environmentally acceptable or compatible.

In addition, the hydrofluoroether compounds exhibit characteristics that make them well-suited for use as battery electrolyte solvents. For example, the compounds generally have high flashpoints; low viscosities; greater miscibilities with conventional battery electrolyte solvents than those of the corresponding perfluorinated solvents; adequate abilities, at least when mixed with conventional electrolyte solvent(s), to dissolve fluorine-containing electrolyte salts; and high stabilities with respect to metallic lithium.

Preparation of Hydrofluoroether Compounds

The hydrofluoroether compounds can be prepared by first effecting a free radical addition of at least one perfluoroolefin or perfluorovinyl ether starting compound and at least one hydrocarbon or addition-capable fluorocarbon alcohol. This results in the formation of at least one fluoroalcohol intermediate. The fluoroalcohol intermediate can then be anionically added to at least one perfluoroolefin or perfluorovinyl ether finishing compound (which can be the same as or different from the perfluoroolefin or perfluorovinyl ether used in the first addition reaction) to form at least one hydrofluoroether compound. Alternatively, when the alcohol is polyfunctional, the types of addition reactions can be reversed, with the first addition being an anionic addition and the second being a free radical addition. The order of the steps is thus non-limiting and can be modified so as to produce a desired chemical composition.

Perfluoroolefins that are useful in carrying out the preparation process of the invention include those that contain at least one carbon atom bonded to one of the carbon atoms of the olefinic double bond. Useful perfluorovinyl ethers include those that possess a terminal difluoromethylene group as part of the olefinic double bond. Such perfluoroolefins and perfluorovinyl ethers optionally can further contain one or more catenated heteroatoms (in addition to the ether oxygen of the perfluorovinyl ether).

The perfluoroolefin starting compounds can be prepared by any of a variety of standard synthetic procedures that are well-known in the art. The perfluorovinyl ether starting compounds can be prepared by the reaction of a perfluorinated acyl fluoride or a perfluorinated ketone with hexafluoropropylene oxide (HFPO) to form an intermediate branched acyl fluoride adduct. This adduct can then be reacted with a base to form an intermediate carboxylic acid salt, which can then be decarboxylated at elevated temperature (optionally, in the presence of an inert solvent). Some perfluoroolefins and perfluorovinyl ethers (for example, $CF_2=CF_2$, $CF_3CF=CF_2$, $C_5F_{11}CF=CF_2$, $C_3F_7OCF=CF_2$, $C_3F_7OCF(CF_3)$ $CF_2OCF=CF_2$, $CF_3CF=CFC_2F_5$, $CF_{3OCF=CF2}$, $(CF_3)_2$ $CFCF=CFCF_3$, perfluorocyclobutene, perfluorocyclopentene, and perfluorocyclohexene) are also commercially available (for example, from Synquest or from Apollo Scientific, Ltd.).

Representative examples of perfluoroolefins that are useful in preparing the hydrofluoroether compounds include $CF_2=CF_2$, $CF_3CF=CF_2$, $C_3F_7CF=CF_2$, $C_3F_7OCF_2CF=CF_2$, $(CF_3)_2NC_3F_6OCF_2CF=CF_2$, $CF_3CF_2CF=CF_2$, $(CF_3)_2CFCF=CFCF_3$, $CF_3CF=CFC_2F_5$, perfluorocyclopentene, perfluorocyclobutene, perfluorocyclohexene, and the like, and mixtures thereof (Mixtures of starting compounds and/or mixtures of finishing compounds can be used, if desired, but mixtures are generally less preferred due to the resulting production of product mixtures that can require purification.) Preferred perfluoroolefins include $CF_2=CF_2$, $CF_3CF=CF_2$, $(CF_3)_2$ $CFCF=CFCF_3$, $CF_3CF=CFC_2F_5$, and mixtures thereof $CF_3CF=CF_2$, $(CF_3)_2CFCF=CFCF_3$, and mixtures thereof are more preferred.

Representative examples of perfluorovinyl ethers that are useful in preparing the hydrofluoroether compounds include $C_3F_7OCF=CF_2$, $C_3F_7OCF(CF_3)CF_2OCF=CF_2$, $CF_3OCF=CF_2$, $C_4F_9OCF=CF_2$, $CF_3OC_3F_6OCF=CF_2$, and the like, and mixtures thereof Preferred perfluorovinyl ethers include $C_3F_7OCF=CF_2$, $C_4F_9OCF=CF_2$, $CF_3OC_3F_6OCF=CF_2$, and mixtures thereof $C_3F_7OCF=CF_2$, $C_4F_9OCF=CF_2$, and mixtures thereof are more preferred.

Alcohols that are useful in carrying out the preparation process include those that have at least one free radically abstractable hydrogen atom located alpha to the hydroxyl group (that is, bonded to the carbon atom that is bonded to the hydroxyl group). Such alcohols include both hydrocarbon alcohols and fluorocarbon alcohols (for example, those that can be represented by the general formula $RfC_2H_4OH$, wherein $R_f$ is a perfluoroalkyl or fluoroalkyl group that optionally contains at least one catenated heteroatom and that preferably contains from one to about twelve carbon atoms). The alcohols can be monofunctional or polyfunctional and, optionally, can contain one or more catenated heteroatoms.

Such alcohols are generally commercially available and provide product hydrofluoroether compounds that comprise a substituted or unsubstituted oxymethylene group. Hydrocarbon alcohols can be preferred due to their relatively lower cost (in comparison with fluorocarbon alcohols), although preferred alcohols are generally those that provide product HFE compounds that are non-flammable. Thus, more preferred are hydrocarbon alcohols having no more than about six carbon atoms (most preferably, no more than about three carbon atoms).

Representative examples of suitable alcohols include methanol, ethanol, isopropanol, ethylene glycol, 1-propanol, 1-butanol, 2-butanol, 2-methyl-1-propanol, 2-methoxyethanol, 1,2-propanediol, 1,3-propanediol, glycerol, $(CH_3)_2$ $NC_2H_4OH$, $C_4F_9CH_2CH_2OH$, $C_4F_9CH_2CH_2CH_2OH$, $CgF_{17}CH_2CH_2CH_2OH$, $C_4F_9OCH_2CH_2OH$, and the like, and mixtures thereof Preferred alcohols include methanol, ethanol, isopropanol, 1,3-propanediol, ethylene glycol, and mixtures thereof. Methanol, ethanol, isopropanol, and mixtures thereof are more preferred.

The free radical addition reaction can be effected by combining the perfluoroolefin or perfluorovinyl ether starting compound and the alcohol (or the fluoroalcohol intermediate) in the presence of at least one free radical initiator. Suitable free radical initiators include peroxides, peroxyesters, peroxycarbonates, and the like, and mixtures thereof. Examples of such initiators include t-amylperoxy-2-ethylhexanoate (available as LUPEROX 575 from Arkema, Crosby, Tex.), lauryl peroxide, t-butyl peroxide, t-amylperoxy-2-ethylhexyl carbonate, and mixtures thereof, with t-amylperoxy-2-ethylhexanoate being a preferred initiator.

For example, liquid starting compound, excess alcohol, and the initiator can be combined in any order in a reactor (for example, a pressure reactor), which can then be heated to a desired reaction temperature (for example, from about 50° C. to about 120° C.) under autogenous pressure (and generally with stirring or agitation). Solvents that are not very reactive under the reaction conditions (for example, methyl isobutyl ketone or a hydrofluoroether compound such as a NOVEC brand fluid available from 3M Company, St. Paul, Minn.) can be utilized, if desired, but are generally not needed due to the presence of the alcohol reactant.

When a gaseous starting compound (for example, hexafluoropropylene or $CF_3OCF=CF_2$) is utilized, the reactor can be sealed after addition of the alcohol and the initiator and prior to heating. The gaseous starting compound can then be added at a desired reaction temperature, either continuously or in portions, until a stoichiometric (or greater) amount of starting compound has been added or until the reaction rate has slowed significantly.

After completion of starting compound addition, or after the reaction has run to completion, the reactor can be cooled and vented and the contents purified by, for example, distillation. Generally, the reaction can be run for a period of time equivalent to about ten half lives of the free radical initiator. Alternatively, a free radical quencher (for example, ascorbic acid) can be added to decompose any remaining initiator prior to purification. Those skilled in the art will recognize that the optimum process conditions and procedure for a particular reaction will be determined by the nature of the selected starting compound, alcohol, and initiator. Free radical addition reactions of this type have been described, for example, by Costa et al. in J. Macromol. Sci.-Chem., A18 (2), 299 (1982), the description of which is incorporated herein by reference.

The anionic addition reaction can be effected by combining the perfluoroolefin or perfluorovinyl ether starting compound and the fluoroalcohol intermediate (or the starting alcohol) in the presence of at least one anionic addition catalyst (for example, a Lewis base). Useful catalysts include potassium carbonate, cesium carbonate, potassium fluoride, potassium hydroxide, potassium methoxide, triethylamine, trimethylamine, potassium cyanate, potassium bicarbonate, sodium carbonate, sodium bicarbonate, cesium fluoride, potassium bifluoride, potassium acetate, and the like, and mixtures thereof, with potassium carbonate, potassium bicarbonate, and mixtures thereof being preferred.

The reactants and catalyst can be combined in a reactor (for example, a pressure reactor) in any order, and the reaction can be run at a desired temperature (for example, from about 30° C. to about 50° C.) under the above-described conditions of pressure and agitation. Generally, however, use of a nonreactive, polar solvent (for example, acetonitrile, tetrahydrofuran, glyme, or a mixture of two or more thereof) can facilitate the reaction. The resulting product can be purified by, for example, distillation. Olefinic reaction by-products can be removed by reaction with a reagent that will preferentially react with the olefinic double bond. Such reagents include, for example, anhydrous hydrogen fluoride; potassium bifluoride in a polar, aprotic solvent, with or without a phase transfer catalyst; potassium permanganate in acetone; and elemental bromine with or without irradiation. Anionic addition reactions of this type have been described, for example, in U.S. Pat. No. 3,962,348 (Benninger et al.), International Patent Publication No. WO 02/102858 (Honeywell International, Inc.), and by K. Chi and G. Furin in Bull. Korean Chem. Soc. 20 (2), 220 (1999), the descriptions of which are incorporated herein by reference.

Preferably, the free radical addition reaction is carried out first, followed by the anionic addition. When a polyfunctional alcohol is utilized, however, the two types of addition reactions can be carried out in either order, provided that, when the anionic addition reaction is carried out first, the ratios of the reactants are controlled such that the main reaction product is the desired first fluoroalcohol intermediate. (When the anionic addition reaction is carried out first with a polyfunctional alcohol, the process also generally involves a third addition reaction (anionic in type) to convert a second fluoroalcohol intermediate (resulting from the second addition reaction, which is free radical in type) to the desired hydrofluoroether compound.) The process can therefore enable the production of a wide variety of different hydrofluoroether compounds by varying the order of the addition steps and the nature of the reactants.

Electrolyte Compositions

The hydrofluoroether compounds can be utilized to prepare the electrolyte compositions of the invention, which comprise (a) a solvent composition including at least one hydrofluoroether compound; and (b) at least one electrolyte salt.

The hydrofluoroether compounds described in this disclosure have excellent oxidative stability, and when these compounds are used in electrolyte compositions the resulting compositions also have outstanding oxidative stability. For example, when the hydrofluoroether compounds are used in an electrochemical device with a graphitized carbon electrode, the compounds and/or the compositions have an oxidative stability of at least 5V and up to 8V vs. Li/Li+.

An electrochemical device with the electrolyte compositions described herein has excellent performance. For example, an electrochemical device using the electrolyte compositions described herein may, in some embodiments, have a discharge capacity of greater than 50%, preferably greater than 80%, at a discharge current of up to 12 CmA. An electrochemical device including the electrolyte composition described in this disclosure may, in some embodiments, have a charge capacity of greater than about 40%, preferably greater than about 60%, at a charge current of up to 6 CmA. An electrochemical device including the electrolyte compositions described herein may, in some embodiments, have excellent low temperature performance, and may retain over 90% of its discharge capacity at 25° C. when exposed to ambient temperatures from 0° C. to −20° C. The electrochemical device including the presently described electrolyte compositions may, in some embodiments, retain a discharge capacity of greater than 150 mAh per gram of cathode over up to 30 charging cycles at up to 4.5 V.

Electrolyte salts that are suitable for use in preparing the electrolyte compositions of the invention include those salts that comprise at least one cation and at least one weakly coordinating anion (the conjugate acid of the anion having an acidity greater than or equal to that of a hydrocarbon sulfonic acid (for example, a bis(perfluoroalkanesulfonyl)imide ion); that are at least partially soluble in a selected hydrofluoroether compound (or in a blend thereof with one or more other hydrofluoroether compounds or one or more conventional electrolyte solvents); and that at least partially dissociate to form a conductive electrolyte composition. Preferably, the salts are stable over a range of operating voltages, are non-corrosive, and are thermally and hydrolytically stable.

Suitable cations include alkali metal, alkaline earth metal, Group IIB metal, Group IIIB metal, transition metal, rare earth metal, and ammonium (for example, tetraalkylammonium or trialkylammonium) cations, as well as a proton. Preferred cations for battery use include alkali metal and alkaline earth metal cations.

Suitable anions include fluorine-containing inorganic anions such as $BF_4^-$, $PF_6^-$, $AsF_6^-$, and $SbF_6^-$; $ClO_4^-$; $HSO_4^-$; $H_2PO_4^-$; organic anions such as alkane, aryl, and alkaryl sulfonates; fluorine-containing and unfluorinated tetraarylborates; carboranes and halogen-, alkyl-, or haloalkyl-substituted carborane anions including metallocarborane anions; and fluorine-containing organic anions such as perfluoroalkanesulfonates, cyanoperfluoroalkanesulfonylamides, bis(cyano)perfluoroalkanesulfonylmethides, bis(perfluoroalkanesulfonyl)imides, bis(perfluoroalkanesulfonyl)methides, and tris(perfluoroalkanesulfonyl)methides; and the like. Preferred anions for battery use include fluorine-containing inorganic anions (for example, $BF_4^-$, $PF_6^-$, and $AsF_6^-$) and fluorine-containing organic anions (for example, perfluoroalkanesulfonates, bis(perfluoroalkanesulfonyl)imides, and tris(perfluoroalkanesulfonyl)methides).

The fluorine-containing organic anions can be either fully fluorinated, that is perfluorinated, or partially fluorinated (within the organic portion thereof). Preferably, the fluorine-containing organic anion is at least about 80 percent fluorinated (that is, at least about 80 percent of the carbon-bonded substituents of the anion are fluorine atoms). More preferably, the anion is perfluorinated (that is, fully fluorinated, where all of the carbon-bonded substituents are fluorine atoms). The anions, including the preferred perfluorinated anions, can contain one or more catenary heteroatoms such as, for example, nitrogen, oxygen, or sulfur.

Preferred fluorine-containing organic anions include perfluoroalkanesulfonates, bis(perfluoroalkanesulfonyl)imides, and tris(perfluoroalkanesulfonyl)methides. The perfluoroalkanesulfonates and bis(perfluoroalkanesulfonyl)imides are more preferred anions, with the perfluoroalkanesulfonates being most preferred.

Preferred salts for battery use are lithium salts. More preferred are lithium hexafluorophosphate, lithium bis(trifluoromethanesulfonyl)imide, lithium bis(perfluoroethanesulfonyl)imide, lithium tetrafluoroborate, lithium perchlorate, lithium hexafluoroarsenate, lithium trifluoromethanesulfonate, lithium tris(trifluoromethanesulfonyl)methide, and mixtures of two or more thereof.

The electrolyte composition of the invention can be prepared by combining at least one electrolyte salt and a solvent composition including at least one hydrofluoroether compound, such that the salt is at least partially dissolved in the solvent composition at the desired operating temperature. The hydrofluoroether compounds (or a normally liquid composition including, consisting, or consisting essentially thereof) can be used in such preparation.

The electrolyte salt is preferably employed in the electrolyte composition at a concentration such that the conductivity of the electrolyte composition is at or near its maximum value (typically, for example, at a $Li^+$ molar concentration of around 0.1-2.0 M, preferably about 1.0 M, for electrolytes for lithium batteries), although a wide range of other concentrations will also serve.

Preferably, one or more conventional electrolyte solvents are mixed with the hydrofluoroether compound(s) (for example, such that the hydrofluoroether(s) constitute from about 20 to about 80 or 90 percent of the resulting solvent composition). Useful conventional electrolyte solvents include organic and fluorine-containing electrolyte solvents (for example, propylene carbonate, ethylene carbonate, dimethyl carbonate, diethyl carbonate, ethyl methyl carbonate, dimethoxyethane, γ-butyrolactone, diglyme (that is, diethylene glycol dimethyl ether), tetraglyme (that is, tetraethylene glycol dimethyl ether), monofluoroethylene carbonate, tetrahydrofuran, alkyl-substituted tetrahydrofuran, 1,3-dioxolane, alkyl-substituted 1,3-dioxolane, tetrahydropyran, alkyl-substituted tetrahydropyran, and the like, and mixtures thereof). Other conventional additives (for example, a surfactant) can also be present, if desired.

Electrochemical Devices

The electrolyte composition of the invention can be used as an electrolyte in electrochemical devices including, for example, such devices as fuel cells, batteries, capacitors, and electrochromic windows. Such devices typically comprise at least one first electrode, at least one second electrode, at least one separator, and an electrolyte composition of the invention.

A variety of negative and positive electrodes may be employed in lithium-ion cells of the invention. Representative negative electrodes include graphitic carbons e.g., those having a spacing between (002) crystallographic planes, $d_{002}$, of 3.45 Å>$d_{002}$>3.354 Å and existing in forms such as powders, flakes, fibers or spheres (e.g., mesocarbon microbeads); $Li_{4/3}Ti_{5/3}O_4$; the lithium alloy compositions described in U.S. Pat. No. 6,203,944 (Turner '944) entitled "ELECTRODE FOR A LITHIUM BATTERY" and PCT Published Patent Application No. WO 00103444 (Turner PCT) entitled "ELECTRODE MATERIAL AND COMPOSITIONS"; and combinations thereof. Representative positive electrodes include $LiFePO_4$, $LiMnPO_4$, $LiCoPO_4$, $LiMn_2O_4$, $LiCoO_2$ and combinations thereof. The negative or positive electrode may contain additives such as will be familiar to those skilled in the art, e.g., carbon black for negative electrodes and carbon black, flake graphite and the like for positive electrodes.

A variety of powdered materials may be employed to make electrode compositions. Exemplary powdered materials may for example contain silicon, silver, lithium, tin, bismuth, lead, antimony, germanium, zinc, gold, platinum, palladium, arsenic, aluminum, gallium, indium, thallium, alloys containing any of the foregoing metals or metalloids and other powdered active metals and metalloids that will be familiar to those skilled in the art. Exemplary powders may have a maximum dimension that is no greater than 60 micrometers, no greater than 40 micrometers, or no greater than 20 micrometers. The powders may for example have a maximum particle diameter that is submicron, at least 1 micrometer, at least 2 micrometers, at least 5 micrometers, or at least 10 micrometers. For example, suitable powders often have a maximum dimension of 1 to 60 micrometers, 10 to 60 micrometers, 20 to 60 micrometers, 40 to 60 micrometers, 1 to 40 micrometers, 2 to 40 micrometers, 10 to 40 micrometers, 5 to 20 micrometers, or 10 to 20 micrometers. The powdered materials may contain optional matrix formers within powder particles. Each phase originally present in the particle (i.e., before a first lithiation) may be in contact with the other phases in the particle. For example, in particles based on a silicon:copper:silver alloy, a silicon phase may be in contact with both a copper silicide phase and a silver or silver alloy phase. Each phase in a particle may for example have a grain size less than 500 Angstroms, less than 400 Angstroms, less than 300 Angstroms, less than 200 Angstroms, or less than 150 Angstroms.

One exemplary silicon-containing powdered material is the silicon alloy $Si_{57}Al_{28}Fe_{15}$. Other exemplary powdered materials include lithium alloys such as $Li_{4/3}Ti_{5/3}O_4$, $LiV_3O_8$, $LiV_2O_5$, $LiCo_{0.2}Ni_{0.8}O_2$, $LiNiO_2$, $LiFePO_4$, $LiMnPO_4$, $LiCoPO_4$, $LiMn_2O_4$, and $LiCoO_2$; lithium atoms intercalated within a lithium transition metal oxide such as lithium cobalt dioxide, lithium nickel dioxide, and lithium manganese dioxide; the lithium alloy compositions described in U.S. Pat. No. 6,203,944 (Turner '944), U.S. Pat. No. 6,255,017 B1 (Turner '017), U.S. Pat. No. 6,436,578 B2 (Turner et al. '578), U.S. Pat. No. 6,680,145 B2 (Obrovac et al.) and U.S. Pat. No. 6,699,336 B2 (Turner et al. '336), U.S. Patent Application Publication 2003/0211390 A1 (Dahn et al.), U.S. Pat. No. 7,498,100 (Christensen et al., the disclosure of which is incorporated herein by reference) and U.S. Application Publication 2006/0046144 (Obravoac) (the disclosure of which is incorporated herein by reference); graphitic carbons, e.g., those having a spacing between (002) crystallographic planes, $d_{002}$, of 3.45 Å>$d_{002}$>3.354 Å and existing in forms such as powders, flakes, fibers or spheres (e.g., mesocarbon microbeads); combinations thereof and other powdered materials that will be familiar to those skilled in the art. Some powdered alloy particles may include a conductive coating. For example, a particle that contains silicon, copper, and silver or a silver alloy may be coated with a layer of conducting material (e.g., with the alloy composition in the particle core and the conductive material in the particle shell). Suitable conductive materials include, for example, carbon, copper, silver, or nickel.

Exemplary powdered alloy materials may be prepared, for example, using a melt spinning process. Such processes are described generally, for example, in Amorphous Metallic Alloys, F. E. Luborsky, ed., Chapter 2, Butterworth & Co., Ltd. (1983). According to this process, ingots containing the alloy composition can be melted in a radio frequency field and then ejected through a nozzle onto a surface of a rotating wheel (e.g., a copper wheel). Because the surface temperature of the rotating wheel is substantially lower than the temperature of the melt, contact with the surface of the rotating wheel quenches the melt. Quenching minimizes the formation of large crystallites that can be detrimental to electrode performance. When conductive coatings are employed, they may be formed using techniques such as electroplating, chemical vapor deposition, vacuum evaporation or sputtering.

The electrodes of, for example, a lithium battery generally consist of a metallic foil or particles of active material blended with a conductive diluent such as carbon black or graphite bound into a polymeric material binder. Typical binders include polytetrafluoroethylene, polyvinylidene fluoride, ethylene-propylene-diene (EPDM) terpolymer, and emulsified styrene-butadiene rubber (SBR), and the binder can be cross-linked. The binder can also be, for example, a solid carbon matrix formed from the thermal decomposition of an organic compound. The metallic foil or composite electrode material is generally applied to an expanded metal screen or metal foil (preferably aluminum, copper, nickel, or stainless steel) current collector using any of a variety of processes such as coating, casting, pressing or extrusion.

Some examples of suitable first electrodes are lithium metal, aluminum, lithium metal alloys, sodium metal, platinum and palladium and alloys thereof, carbon-based materials such as graphite, coke, carbon, pitch, transition metal oxides (for example, $LiTi_5O_{12}$ and $LiWO_2$), and lithiated tin oxide. In the case of lithium ion batteries, the lithium can be intercalated into a host material such as carbon (that is, to give lithiated carbon) or carbon alloyed with other elements (such as silicon, boron or nitrogen), a conductive polymer, or an inorganic host that is intercalatable (such as $Li_xTi_5O_{12}$). The material including the first electrode can be carried on foil (for example, nickel and copper) backing or pressed into expanded metal screen and alloyed with various other metals.

Active second electrode materials generally provide device voltages of at least about 3.0 volts at a full state of charge relative to $Li/Li^+$. Suitable second electrode materials include graphite; carbon; aluminum; $MnO_2$; platinum, palladium, and alloys thereof, a composite oxide including Li and a transition metal such as $LiCoO_2$, $LiNiO_2$, $LiV_3O_8$, $LiMn_2O_4$, etc.; $V_2O_5$; $V_6O_{13}$; $Ba_2SmNiO_5$; $SmMnO_3$; $Sm_3Fe_5O_{12}$; $EuFeO_3$; $EuFe_5O_{12}$; $EuMnO_3$; $LaNiO_3$; $La_2CoO_4$ and $LaMnO_3$ (including the charged and discharged forms of these materials); oxides of ruthenium or tungsten; indium tin oxide; and conducting polymers such as polypyrrole, polysulfides and polyvinylferrocene. In primary batteries, the second electrode can be fluorinated carbon (for example, $(CF)_n$), $SO_2Cl_2$, $Ag_2V_4O_{11}$, $Ag_2CrO_4$, sulfur, polysulfide, or an $O_2$ or $SO_2$ electrode.

Lithium batteries generally contain a separator to prevent short-circuiting between the first and second electrodes. The separator often consists of a single-ply or multi-ply sheet of microporous polymer (typically polyolefin, for example, polyethylene, polypropylene, or combinations thereof) having a predetermined length and width and having a thickness of less than about 1.0 mil (0.025 mm). For example, see U.S. Pat. No. 3,351,495 (Larsen et al.), U.S. Pat. No. 4,539,256 (Shipman et al.), U.S. Pat. No. 4,731,304 (Lundquist et al.) and U.S. Pat. No. 5,565,281 (Yu et al.). The pore size in these microporous membranes, typically about 5 microns in diameter, is sufficiently large to allow transport of ions but is sufficiently small to prevent electrode contact, either directly or from particle penetration or dendrites which can form on the electrodes.

The electrochemical devices of the invention can be used in various electronic articles such as computers, power tools, automobiles, telecommunication devices, and the like.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

All parts, percentages, ratios, etc. in the examples and the rest of the specification are by weight, unless noted otherwise. Solvents and other reagents used were obtained from Aldrich Chemical Company, Milwaukee, Wis. unless otherwise noted.

In the following compound preparations, mixtures of diastereomers were obtained due to the presence of two (or more) optical centers in the molecules. These diastereomers had boiling points that were very close together, and thus the diastereomers were not separated by distillation. In many cases, however, such diastereomers can be easily separated by gas chromatography.

Test Methods

Nuclear Magnetic Resonance (NMR)

$^1H$ and $^{19}F$ NMR spectra were run on a Varian UNITYplus 400 fourier transform NMR spectrometer (available from Varian NMR Instruments, Palo Alto, Calif.).

Gas Chromatouraphy/Mass Spectroscopy (GCMS)

GCMS samples were run on, for example, a Finnigan TSQ7000 mass spectrometer (available from Thermo Electron Corporation, Waltham, Mass.).

Viscosity Measurement

Kinematic viscosities were measured using Ubbelohde glass capillary viscometers (available from Cannon Instrument Co., State College, Pa.) and a SCHOTT AVS350 viscometer timer (available from Schott North America, Elmsford, N.Y.). Temperature was controlled using a Lawler temperature control bath (available from Lawler Manufacturing Company, Inc., Indianapolis, Ind.) filled with NOVEC-7500 (a hydrofluoroether; available from 3M Company, St.

Paul, Minn.). The Lawler bath was cooled by a JULABO F-83 refrigerated circulator (available from Julabo USA, Allentown, Pa.).

Flashpoint Measurement

Closed cup flashpoints were measured using the ASTM (American Society for Testing of Materials) Test Method D-3278-96 e-1, "Flash Point of Liquids by Small Scale Closed-Cup Apparatus."

Table of Abbreviations

| Abbreviation or Trade Designation | Description |
|---|---|
| HFP | hexafluoropropene |
| LUPEROX 575 | t-amyl peroxy-2-ethylhexanoate free radical initiator, commercially available from Arkema, Crosby, TX |
| ADOGEN 464 | phase transfer catalyst, methyltrialkyl ($C_8$-$C_{10}$) ammonium chloride, 49% solution in anhydrous diglyme |
| HFP dimer | $CF_3CF=CFCF(CF_3)_2$ |
| b.p. | Boiling point, measured at ambient pressure unless otherwise specified |
| b.r. | Boiling range, measured at ambient pressure unless otherwise specified |

Preparation of Hydrofluoroether Compounds And Intermediates

Compound No. 1

Preparation of $C_3F_7OCFHCF_2CH_2OCF_2CFHCF_3$ $C_3F_7OCFHCF_2CH_2OH$ was prepared by the reaction of $C_3F_7OCF=CF_2$ (53 g, 0.2 mol) with methanol (63.7 g, 2.0 mol) using t-amylperoxybenzoate (1.0 g) as free radical initiator at 106° C. The product reaction mixture was washed with water and distilled and the distillation fraction of b.r.=115-117° C. used in the next step.

$C_3F_7OCFHCF_2CH_2OH$ (18.5 g, 0.062 mol), potassium carbonate (1.67 g, 0.012 mol), and anhydrous acetonitrile (73.1 g) were placed in a 500 mL round bottom flask equipped with a magnetic stir bar, a gas inlet tube, and a solid carbon dioxide/acetone condenser. The resulting reaction mixture was heated while stirring to 45° C., and addition of HFP (10 g) through the gas inlet tube was begun. After 10 minutes, the internal temperature of the reaction mixture reached 54° C., and the addition of HFP was halted. After cooling back to 45° C., an additional 10 g of HFP was added. After stirring for 16 hours at room temperature, the mixture was poured into a separatory funnel. The resulting lower fluorochemical phase was separated and washed once with brine, and the resulting lower phase was separated to yield 25.1 g. GCMS analysis of this material showed that it contained about 61% of the product hydrofluoroether $C_3F_7OCFHCF_2CH_2OCF_2CFHCF_3$ and 21% of several olefins formed by loss of one or two moles of hydrogen fluoride (HF) from the parent compound. Treatment of this mixture with anhydrous HF did not result in HF addition to the olefin; no reaction occurred.

19.2 g of the ether/olefin mixture was treated with 4.5 g potassium bifluoride ($KHF_2$), 3.0 g of a 50% by weight solution of ADOGEN 464 in anhydrous diglyme, and solvent diglyme (55.4 g) at 110° C. for 16 hours. The resulting reaction mixture was poured into water, and the resulting lower fluorochemical phase was separated and then distilled in a concentric tube fractionating unit (Ace Glass Catalog Number 9331, Ace Glass Inc., Vineland, N.J.). The resulting distillate was washed with water to remove the co-distilled diglyme to provide a product having about 94% product hydrofluoroether and 6% remaining olefins.

Compound No. 2

Preparation of $CF_3CFHCF_2CH_2OH$

Methanol (150.0 g, 4.68 mol) and LUPEROX 575 (6 g, 0.024 mol) were combined in a 600 mL Parr reactor. HFP was added at a continuous rate at a temperature of 75° C. to the reactor until a total of 190.0 g (1.26 mol) had been added. The resulting reaction mixture was then stirred for 16 hours at 75° C. to destroy any remaining free radical initiator. The contents of the reactor were then emptied and excess methanol was removed through rotary evaporation.

Compound No. 3

Preparation of $CF_3CFHCF_2CH(CH_3)OCF_2CFHCF_3$

Ethanol (100 g, 2.17 mol) and LUPEROX 575 (6 g, 0.024 mol) were combined in a 600 mL Parr reactor. The temperature of the reactor was set to 75° C., and HFP was added at a continuous rate up to a total amount of 202.5 g (1.35 mol). The resulting reaction mixture was allowed to stir for 16 hours at 75° C. to destroy remaining free radical initiator. The resulting alcohol was purified using a 10-plate Oldershaw perforated plate column (b.p.=120° C., 97%).

200 g of this alcohol were combined with potassium carbonate (14.7 g, 0.102 mol) and 100 mL of acetonitrile in a 600 mL Parr reactor. The reactor temperature was set to 35° C., and HFP was added at a continuous rate for a total of 170 g (1.13 mol). The reactor contents were emptied, and the acetonitrile was removed through rotary evaporation. The resulting product contained the olefin of the desired hydrofluoroether, which was removed through treatment with anhydrous HF at room temperature (essentially as described in U.S. Patent Publication No. 2005/0127322 (Costello et al.)). The resulting material was then fractionated using a 10-plate Oldershaw column (purity=99%, b.p.=130° C.). Viscosity measurements, GCMS data, and NMR spectra were obtained. The viscosity of the material was $1.4 \times 10^{-5}$ $m^2$/s (14 centistokes) at −50° C., and the GCMS and NMR ($^1H$ and $^{19}F$) results confirmed the above hydrofluoroether product structure.

Compound No. 4

Preparation of $CF_3CFHCF_2C(CH_3)_2OCF_2CFHCF_3$

Isopropanol (200.0 g, 3.32 mol) and LUPEROX 575 (6 g, 0.024 mol) were combined in a 600 mL Parr reactor. The temperature of the reactor was set at 75° C. HFP was added at a continuous rate to the reactor for a total of 327.2 g (2.2 mol). The resulting reaction mixture was allowed to stir for 16 hours at 75° C. to destroy remaining free radical initiator. The reactor contents were then emptied, and excess isopropanol was removed by rotary evaporation. The resulting product alcohol was then fractionated using a 10-plate Oldershaw column.

100 g (0.47 mol) of the purified alcohol (99%, b.p.=127° C.) were added to a 600 mL Parr reactor with potassium carbonate (6.5 g, 0.047 mol) and acetonitrile (200 mL). The reactor temperature was set to 35° C., and HFP was added at a continuous rate to the reactor to a total of 77.5 g (0.5 1 mol, 10% excess). The reactor contents were emptied, and the acetonitrile was removed by rotary evaporation. The resulting product was then distilled using a concentric tube column. Samples of the resulting purified product (99%, b.p.=140° C.) were tested by viscosity measurement, GCMS, NMR, and flashpoint measurement, essentially as described above. The viscosity of the purified product was $1.8 \times 10^{-5}$ $m^2$/s (18 centistokes) at −50° C., and its flashpoint was measured as 54° C.

(130° F.). GCMS and NMR ($^1$H and $^{19}$F) confirmed the above hydrofluoroether product structure.

Compound No. 5

Preparation of $CF_3CFHCF_2C(CH_3)_2OCF_2CFHOCF_2CF_2CF_3$

Isopropanol (200.0 g, 3.32 mol) and LUPEROX 575 (6 g, 0.024 mol) were combined in a 600 mL Parr reactor. The reactor temperature was set at 75° C. HFP was added at a continuous rate to the reactor until the pressure began to increase, to a total of 327.2 g (2.2 mol). The resulting reaction mixture was allowed to stir for 16 hours at 75° C. to destroy remaining free radical initiator. The reactor contents were then emptied, and excess isopropanol was removed by rotary evaporation. The resulting product alcohol was then fractionated using a 10-plate Oldershaw column.

100 g (0.47 mol) of the resulting purified alcohol (99%, b.p.=127° C.) was added to a 600 mL Parr reactor with potassium carbonate (6.5 g, 0.047 mol), acetonitrile (200 mL), and perfluoropropylvinylether ($C_3F_7OCF=CF_2$, 109 g, 0.52 mol). The reactor temperature was set to 40° C., and the resulting reaction mixture was allowed to stir for 16 hours, during which time the pressure on the reactor dropped to zero. The reactor contents were emptied, and the acetonitrile was removed through rotary evaporation. The resulting product was purified using a concentric tube column. Samples of the purified product (99%, b.p.=171° C.) were tested by viscosity measurement, GCMS, NMR, and flashpoint measurement, essentially as described above. The viscosity of the purified product was $5.7 \times 10^{-5}$ m$^2$/s (57 centistokes) at −50° C., and no flashpoint was observed. GCMS and NMR ($^1$H and $^{19}$F) confirmed the above hydrofluoroether product structure.

Compound No. 6

Preparation of $CF_3CF(CH_2OCF_2CFHCF_3)CFHCF(CF_3)_2$ And $CF_3CFH(CH_2OCF_2CFHCF_3)CFCF(CF_3)_2$ HFP dimer (106.5 g, 0.35 mol), LUPEROX 575 (6 g, 0.024 mol), and methanol (200 g, 6.25 mol) were combined in a 600 mL Parr reactor. The temperature of the reactor was set to 75° C., and the resulting reaction mixture was stirred for 16 hours. The reactor contents were emptied, and the excess methanol was removed by rotary evaporation.

The resulting product alcohol (100 g, 0.03 mol) was combined with potassium carbonate (4.1 g, 0.03 mol) and acetonitrile (150 mL) in a 600 mL Parr reactor. The reactor temperature was set to 40° C., and HFP was added to the reactor at a continuous rate up to a total of 50 g (0.33 mol). The reactor contents were emptied, and the acetonitrile was removed through rotary evaporation. The olefin of the desired hydrofluoroether product was present and was removed by reaction with anhydrous HF at room temperature. The resulting product was distilled using a concentric tube column (b.p.=155° C.; 93% desired product in approximately a 50/50 mixture of the two isomers shown above). GCMS and NMR ($^1$H and $^{19}$F) confirmed the above hydrofluoroether product structures.

Compound No. 7

Preparation of $CF_3CFHCF_2CH(OCF_2CFHCF_3)CH_2OCF_2CFHCF_3$

Ethylene glycol (1.0 mol) and LUPEROX 575 (5 g, 0.02 mol) are combined in a 600 mL Parr reactor. The temperature of the reactor is set to 75° C., and HFP (1.1 mol) is added to the reactor at a continuous rate. The resulting reaction mixture is allowed to stir at this temperature for 16 hours. The resulting crude reaction material is distilled under vacuum to afford $CF_3CFHCF_2CH(OH)CH_2OH$ as a mixture of diastereomers.

The resulting diol (1.0 mol) is combined in a reactor with potassium carbonate (0.1 mol) and acetonitrile (100 mL) and heated to 40° C. HFP (2.19 mol) is added at a continuous rate to the reactor, and the resulting reaction mixture is stirred for 18 hours at 40° C. The reactor contents are emptied, and the acetonitrile is removed through rotary evaporation. The resulting product contains dehydrofluorinated olefins of the desired hydrofluoroether product, which are converted by reaction with anhydrous HF at room temperature to the diether product. The product is fractionated using a concentric tube column.

Compound No. 8

Preparation of $CF_3CFHCF_2CH_2OCF_2CFHOC_3F_7$

Hexafluorobutanol, $CF_3CFHCF_2CH_2OH$ (75 g, prepared essentially as described above (Compound 2)), was combined with potassium carbonate (11.4 g, 0.082 mol), $C_3F_7OCF=CF_2$ (120.5 g, 0.45 mol), and 100 mL of acetonitrile in a 600 mL Parr reactor. The temperature of the reactor was raised to 45° C., and the resulting reaction mixture was stirred for about 96 hours. The reactor was cooled and the contents of the reactor poured into water. The resulting lower phase was separated and washed two more times with an equal volume of water. The resulting product (98.5% pure by gas/liquid chromatography (GLC), 150 g) was distilled using a concentric tube column, with the product cut boiling at 144-146° C. The structure of the product was confirmed by GCMS. The approximately 1% olefins that were formed in the reaction were removed essentially as described above by reaction with potassium bifluoride in diglyme.

Compound No. 9

Preparation of $CF_3CFHCF_2CH_2OCF_2CFHOCF_3$

Hexafluorobutanol, $CF_3CFHCF_2CH_2OH$ (65.3 g, 0.34 mol), prepared essentially as described above (Compound 2), was combined with potassium carbonate (9.9 g, 0.072 mol) and 133 g of acetonitrile in a 600 mL Parr reactor. The temperature of the reactor was raised to 45° C. and $CF_3OCF=CF_2$ (65.6 g, 0.39 mol) added as a gas over about two hours. The resulting reaction mixture was stirred for about 18 hours at 45° C. The reactor was cooled and the contents of the reactor filtered to remove the potassium carbonate. The resulting product-containing filtrate was distilled using a concentric tube column, with the product cut boiling at 115-119° C. The product structure was confirmed by GCMS.

Compound No. 10

Preparation of $CF_3OCF(CF_3)CF_2OCFHCF_2C(CH_3)_2OCF_2CFHCF_3$ $CF_3OCF(CF_3)CF_2OCFHCF_2C(CH_3)_2OH$ was prepared by the reaction of $CF_3OCF(CF_3)CF_2OCF=CF_2$ (52.9 g, 0.16 mol) with isopropanol (202 g, 3.37 mol) using LUPEROX 575 (11.4 g) as free radical initiator at 75° C. The resulting product reaction mixture was distilled and the distillation fraction of b.r.=161-166° C. used in the next step.

$CF_3OCF(CF_3)CF_2OCFHCF_2C(CH_3)_2OH$ (37.6 g, 0.096 mol), potassium carbonate (4.4 g, 0.032 mol), and anhydrous acetonitrile (144 g) were placed in a 600 mL Parr reaction vessel, which was sealed and heated to 45° C. HFP (34.7 g, 0.23 mol) was added to the vessel as a gas over about one hour and the resulting reaction mixture held, while stirring, for 18 hours at 45° C. After cooling the reaction vessel to room temperature and venting the excess HFP, the reaction vessel was opened, the reaction mixture was filtered to remove the potassium carbonate, and most of the acetonitrile solvent was removed by rotary evaporation. The resulting residue was then distilled in a concentric tube column with the main fraction boiling at 186° C. in greater than 90% purity. The above-shown product structure was confirmed by GCMS.

Compound No. 11

Preparation of $CF_3CFHCF_2CH(CH_3)OCF_2CFHOC_3F_7$

Ethanol (100.0 g, 2.17 mol) and LUPEROX 575 (10.6 g, 0.434 mol) were combined in a 600 mL reactor. The temperature of the reactor was set at 75° C. HFP was added at a continuous rate to the reactor until the pressure began to increase, to a total of 181.0 g (1.2 mol). The resulting reaction mixture was allowed to stir for 16 hours at 75° C. to destroy remaining free radical initiator. The mixture was poured into a separatory funnel, and the resulting lower fluorochemical phase was separated and washed five-fold with water. The resulting lower phase was separated and one-plate distilled to yield 90.0 g boiling between 120-129° C. Analysis by gas chromatography showed this material contained 92.0% of the desired product alcohol, $CF_3CFHCF_2CH(CH_3)OH$.

The resulting product alcohol (90.0 g, 0.46 mol) was combined with potassium carbonate (0.62 g, 0.004 mol) and acetonitrile (300 mL) in a 600 mL Parr reactor. The reactor was heated to about 82° C., and 100 mL of material was distilled from the reactor to remove water present initially in the acetonitrile or potassium carbonate. The reactor was cooled to room temperature, and perfluoropropyl vinyl ether ($C_3F_7OCF=CF_2$, 122.9 g, 0.46 mol) was added. The reactor was sealed, heated to 40° C., and its contents stirred for 16 hours. Analysis by gas chromatography showed no reaction took place. An additional charge of potassium carbonate (6.2 g, 0.045 mol) was added to the reactor and the contents stirred for an additional 16 hours at 40° C. The reactor contents were then emptied, and the acetonitrile was removed through rotary evaporation. The resulting reaction mixture was washed with water and the resulting lower fluorochemical phase separated. The olefin of the desired hydrofluoroether product was present and was removed by treatment with anhydrous HF at room temperature. The resulting product was distilled using a concentric tube column (b.p.=154° C., 86.6 g, 99.4% desired). GCMS confirmed the above hydrofluoroether structure.

Compound No. 12

Preparation of $C_3F_7OCFHCF_2CH(OCF_2CFHCF_3)CH3$

Ethanol (50 g, 1.08 mol), LUPEROX 575 (7 g, 0.028 mol), and perfluoropropylvinylether (290 g, 1.09 mol) were combined in a 600 mL Parr reactor. The temperature of the reactor was set to 75° C., and the resulting reaction mixture was stirred for 16 hours. The reactor was then emptied and excess ethanol was removed by washing with three 250 mL portions of distilled water.

The resulting product alcohol, ($C_3F_7OCFHCF_2CH(OH)CH_3$; 216 g, 0.7 mol) was combined with potassium carbonate (9.6 g, 0.07 mol) and acetonitrile (100 mL) in a 600 mL Parr reactor. The temperature of the reactor was set to 35° C. and hexafluoropropene was added at a continuous rate up to a total of 115.5 g (0.77 mol). The resulting reaction mixture was stirred for 2 hours at this temperature. The reactor contents were emptied, and the potassium carbonate removed through filtration. The acetonitrile solvent was removed through rotary evaporation. The resulting material contained the olefin of the desired ether, which was converted to the final product through reaction of the material (100 g, 0.24 mol) with potassium bifluoride (15 g, 0.19 mol) using diglyme as a solvent (100 mL) and a small amount of ADOGEN 464 (5 g) as a phase transfer catalyst at 110° C. for 24 hours in a 600 mL Parr reactor. The reactor contents were then emptied, and diglyme was removed by washing with water. The resulting ether was purified using a concentric tube column (b.p.=155° C.). The GCMS data were consistent with the above-shown structure.

Compound No. 13

Preparation of $CH_3CH(OCF2CFHCF3)CF(CF_3)CFHCF(CF_3)_2$ And $(CF_3)_2CFCF[CH(OCF_2CFHCF_3)CH_3]CFHCF_3$ Ethanol (60 g, 1.3 mol), LUPEROX 575 (7 g, 0.028 mol), and hexafluoropropene dimer (370 g, 1.23 mol) were combined in a 600 mL Parr reactor. The temperature of the reactor was set to 75° C., and the resulting mixture was stirred for 16 hours. After the initial reaction, an additional charge of LUPEROX 575 was added to the reactor, and the mixture was stirred for an additional 16 hours at 75° C. The reactor was then emptied, and excess hexafluoropropene dimer and ethanol were removed through rotary evaporation.

The resulting product alcohols $CH_3CH(OH)CF(CF_3)CFHCF(CF_3)_2$ and $(CF_3)_2CFCF[CH(OH)CH_3]CFHCF_3$ (248 g, 0.72 mol) were combined with potassium carbonate (9.9 g, 0.072 mol) and 100 mL of acetonitrile in a 600 mL Parr reactor. The temperature of the reactor was set to 35° C., and hexafluoropropene was added continuously up to a total amount of 118 g (0.78 mol). The resulting mixture was stirred for 6 hours at this temperature. The reactor contents were emptied and potassium carbonate removed through filtration. The acetonitrile solvent was removed through rotary evaporation. The resulting product ether was purified using a concentric tube column (b.p.=165° C.). GCMS data were consistent with the above-indicated structures (in about a 70/30 ratio).

Compound No. 14

Preparation of $CF_3CFHCF[CH(OCF_2CFHCF_3)CH_3]CF_2CF_3$ And $CF_3CF_2CFHCF[CH(OCF_2CFHCF_3)CH_3]CF_3$ Ethanol (100 g, 2.17 mol), LUPEROX 575 (7 g, 0.028 mol), and perfluoro-2-pentene (153 g, 0.612 mol) were combined in a 600 mL Parr reactor and heated to 75° C. for 16 hours. After the initial reaction, an additional charge of LUPEROX 575 was added to the reactor, and the resulting mixture was stirred for an additional 16 hours at 75° C. The reactor contents were then emptied and ethanol was removed through two 250 mL water washes.

The resulting product alcohols $CF_3CFHCF[CH(OH)CH_3]CF_2CF_3$ and $CF_3CF_2CFH[CH(OH)CH_3]CFCF_3$ (in about a 50/50 ratio) (165 g, 0.55 mol) were combined with potassium carbonate (9 g, 0.065 mol) and 150 mL of acetonitrile in a 600 mL Parr reactor. Hexafluoropropene was added continuously at a temperature of 35° C. up to a total amount of 105 g (0.7 mol). The resulting reaction mixture was stirred for 30 minutes and then emptied and the potassium carbonate removed through filtration. The acetonitrile solvent was removed through rotary evaporation. The resulting product contained the olefin of the desired ether, which was converted to the final product through treatment with anhydrous HF at room temperature. The product was then fractionated using a concentric tube column (purity=99%, b.p.=155° C., Viscosity (−50° C.) $8.5 \times 10^{-5}$ m²/s (85 centistokes)). GCMS data were consistent for the above-indicated structures.

Examples 1-65

Examples 1-65 were carried out to determine the stability of electrolyte compositions of the present invention. The samples were prepared by dissolving 1 mole of lithium hexafluorophosphate ($LiPF_6$) in 1 L of solvent mixture, and then brought to equilibrium at a predetermined temperature. The solvent mixture contained varying proportions of ethylenecarbonate (EC), diethylcarbonate (DEC), ethylmethylcarbonate (EMC), and a hydrofluoroether according to the invention (HFE). The HFE used throughout Examples 1-83 was $CF_3CFHCF_2CH(CH_3)OCF_2CFHCF_3$ or Compound 3 described above. The stability of the electrolyte compositions were determined by visual inspection of the samples for clarity, uniformity and for the presence of multiple phases. Electrolyte compositions that were clear, uniform and single phase at a given temperature were concluded to be stable at that temperature. Table I below summarizes the results of visual observations, the temperature at which the observations were made as well as the proportions of the various components present in the solvent mixture for each of Examples 1-65.

TABLE I

| Example No: | Solvent Composition: | | | | Temperature (° C.) | Appearance |
| --- | --- | --- | --- | --- | --- | --- |
| | ECL(L) | EMC(L) | DEC(L) | HFE(L) | | |
| Example 1 | 0 | 0.35 | — | 0.65 | 25 | Clear and uniform single phase |
| Example 2 | 0.05 | 0.45 | — | 0.50 | 25 | Clear and uniform single phase |
| Example 3 | 0.05 | 0.35 | — | 0.60 | 25 | Clear and uniform single phase |
| Example 4 | 0.05 | 0.25 | — | 0.70 | 25 | Clear and uniform single phase |
| Example 5 | 0.10 | 0.70 | — | 0.20 | 25 | Clear and uniform single phase |
| Example 6 | 0.10 | 0.60 | — | 0.30 | 25 | Clear and uniform single phase |
| Example 7 | 0.10 | 0.50 | — | 0.40 | 25 | Clear and uniform single phase |
| Example 8 | 0.20 | 0.60 | — | 0.20 | 25 | Clear and uniform single phase |
| Example 9 | 0.20 | 0.50 | — | 0.30 | 25 | Clear and uniform single phase |
| Example 10 | 0.20 | 0.40 | — | 0.40 | 25 | Clear and uniform single phase |
| Example 11 | 0.30 | 0.60 | — | 0.10 | 25 | Clear and uniform single phase |
| Example 12 | 0.30 | 0.50 | — | 0.20 | 25 | Clear and uniform single phase |
| Example 13 | 0.40 | 0.40 | — | 0.20 | 25 | Clear and uniform single phase |
| Example 14 | 0.45 | 0.45 | — | 0.10 | 25 | Clear and uniform single phase |
| Example 15 | 0 | 0.35 | — | 0.65 | 0 | Clear and uniform single phase |
| Example 16 | 0.05 | 0.45 | — | 0.50 | 0 | Clear and uniform single phase |
| Example 17 | 0.05 | 0.35 | — | 0.60 | 0 | Clear and uniform single phase |
| Example 18 | 0.05 | 0.25 | — | 0.70 | 0 | Clear and uniform single phase |
| Example 19 | 0.10 | 0.70 | — | 0.20 | 0 | Clear and uniform single phase |
| Example 20 | 0.10 | 0.60 | — | 0.30 | 0 | Clear and uniform single phase |
| Example 21 | 0.10 | 0.50 | — | 0.40 | 0 | Clear and uniform single phase |
| Example 22 | 0.20 | 0.60 | — | 0.20 | 0 | Clear and uniform single phase |
| Example 23 | 0.20 | 0.50 | — | 0.30 | 0 | Clear and uniform single phase |
| Example 24 | 0.30 | 0.60 | — | 0.10 | 0 | Clear and uniform single phase |
| Example 25 | 0.30 | 0.50 | — | 0.20 | 0 | Clear and uniform single phase |
| Example 26 | 0.45 | 0.45 | — | 0.10 | 0 | Clear and uniform single phase |
| Example 27 | 0 | 0.35 | — | 0.65 | −20 | Clear and uniform single phase |
| Example 28 | 0.05 | 0.45 | — | 0.50 | −20 | Clear and uniform single phase |
| Example 29 | 0.05 | 0.35 | — | 0.60 | −20 | Clear and uniform single phase |
| Example 30 | 0.05 | 0.25 | — | 0.70 | −20 | Clear and uniform single phase |

TABLE I-continued

| Example No: | Solvent Composition: | | | | Temperature (° C.) | Appearance |
|---|---|---|---|---|---|---|
| | ECL(L) | EMC(L) | DEC(L) | HFE(L) | | |
| Example 31 | 0.10 | 0.70 | — | 0.20 | −20 | Clear and uniform single phase |
| Example 32 | 0.10 | 0.60 | — | 0.30 | −20 | Clear and uniform single phase |
| Example 33 | 0.10 | 0.50 | — | 0.40 | −20 | Clear and uniform single phase |
| Example 34 | 0.20 | 0.60 | — | 0.20 | −20 | Clear and uniform single phase |
| Example 35 | 0.20 | 0.50 | — | 0.30 | −20 | Clear and uniform single phase |
| Example 36 | 0.30 | 0.60 | — | 0.10 | −20 | Clear and uniform single phase |
| Example 37 | 0.30 | 0.50 | — | 0.20 | −20 | Clear and uniform single phase |
| Example 38 | 0.05 | — | 0.45 | 0.50 | 25 | Clear and uniform single phase |
| Example 39 | 0.05 | — | 0.35 | 0.60 | 25 | Clear and uniform single phase |
| Example 40 | 0.10 | — | 0.80 | 0.10 | 25 | Clear and uniform single phase |
| Example 41 | 0.10 | — | 0.70 | 0.20 | 25 | Clear and uniform single phase |
| Example 42 | 0.10 | — | 0.60 | 0.30 | 25 | Clear and uniform single phase |
| Example 43 | 0.10 | — | 0.50 | 0.40 | 25 | Clear and uniform single phase |
| Example 44 | 0.10 | — | 0.40 | 0.50 | 25 | Clear and uniform single phase |
| Example 45 | 0.20 | — | 0.70 | 0.10 | 25 | Clear and uniform single phase |
| Example 46 | 0.20 | — | 0.60 | 0.20 | 25 | Clear and uniform single phase |
| Example 47 | 0.20 | — | 0.50 | 0.30 | 25 | Clear and uniform single phase |
| Example 48 | 0.30 | — | 0.60 | 0.10 | 25 | Clear and uniform single phase |
| Example 49 | 0.30 | — | 0.50 | 0.20 | 25 | Clear and uniform single phase |
| Example 50 | 0.40 | — | 0.50 | 0.10 | 25 | Clear and uniform single phase |
| Example 51 | 0.05 | — | 0.45 | 0.50 | 0 | Clear and uniform single phase |
| Example 52 | 0.05 | — | 0.35 | 0.60 | 0 | Clear and uniform single phase |
| Example 53 | 0.10 | — | 0.80 | 0.10 | 0 | Clear and uniform single phase |
| Example 54 | 0.10 | — | 0.70 | 0.20 | 0 | Clear and uniform single phase |
| Example 55 | 0.10 | — | 0.60 | 0.30 | 0 | Clear and uniform single phase |
| Example 56 | 0.20 | — | 0.70 | 0.10 | 0 | Clear and uniform single phase |
| Example 57 | 0.20 | — | 0.60 | 0.20 | 0 | Clear and uniform single phase |
| Example 58 | 0.30 | — | 0.60 | 0.10 | 0 | Clear and uniform single phase |
| Example 59 | 0.40 | — | 0.50 | 0.10 | 0 | Clear and uniform single phase |
| Example 60 | 0.05 | — | 0.45 | 0.50 | −20 | Clear and uniform single phase |
| Example 61 | 0.05 | — | 0.35 | 0.60 | −20 | Clear and uniform single phase |
| Example 62 | 0.10 | — | 0.80 | 0.10 | −20 | Clear and uniform single phase |
| Example 63 | 0.10 | — | 0.70 | 0.20 | −20 | Clear and uniform single phase |
| Example 64 | 0.10 | — | 0.60 | 0.30 | −20 | Clear and uniform single phase |
| Example 65 | 0.20 | — | 0.70 | 0.10 | −20 | Clear and uniform single phase |

Example 66

To test the flammability of an electrolyte composition according to the invention, an oblong shape glass filter, 1 cm wide and 5 cm long, was dipped into an electrolyte composition, prepared by dissolving 1 mol of lithium bis-pentafluoroethanesulfonimide (LiBETI) in a 1 L of solvent mixture containing EC, DEC, and HFE at 5/45/50 volume ratio. After draining excess electrolyte from the glass filter, it was passed through a flame from an alcohol lamp. The glass filter was passed through the flame (immersed in the flame about 1 cm of its length) across its width at a speed of about 20 cm per second. The test was repeated 5 times every 2 seconds unless continuous flaming of glass filter was observed. The electrolyte composition of Example 66 flamed momentary during the third pass but it self-extinguished without continuous flaming when the glass filter was removed from the flame. Momentary ignition and self-extinction, was repeatedly observed during the fourth and fifth pass through the flame.

Comparative Example A

Comparative Example A was carried out in the same manner as the Example 66, except that the electrolyte composition was prepared by dissolving 1 mole of LiBETI in 1 L of a solvent mixture containing EC and DEC at 5/95 volume ratio. Ignition was observed during the first pass through the flame, and continuous flaming occurred even after the glass filter was removed from the flame.

Example 67

Example 67 was carried out the same manner as Example 66, except that the glass filter saturated with the electrolyte composition was not immersed in the flame as it crossed through the flame but rather was about 3 cm away directly above the tip of flame. No ignition was observed throughout the test.

Comparative Example B

Comparative Example B was carried out in the same manner as the Example 67, except that the electrolyte composition was prepared by dissolving 1 mole of LiBETI in 1 L of a solvent mixture containing EC and DEC at 5/95 volume ratio. Ignition was observed during the first pass above the flame, and continuous flaming occurred even after the glass filter was removed away from the flame.

Example 68

Example 68 was carried out the same manner as Example 66, except that the electrolyte composition was prepared by dissolving 1 mol of LiBETI in 1 L of solvent mixture containing EC, DEC, and HFE at 30/20/50 volume ratio. The electrolyte composition of Example 68 flamed momentary during the third pass but it self-extinguished without continuous flaming when the glass filter was removed from the flame. Momentary ignition and self-extinction, was repeatedly observed during the fourth and fifth pass through the flame.

Comparative Example C

Comparative Example C was carried out in the same manner as Example 66, except that the electrolyte composition was prepared by dissolving 1 mole of LiBETI in 1 L of a solvent mixture containing EC and DEC at 30/70 volume ratio. Ignition was observed during the first pass through the flame, and continuous flaming occurred even after the glass filter was removed from the flame.

Example 69

Example 69 was carried out the same manner as Example 68, except that the glass filter saturated with the electrolyte composition was not immersed in the flame as it crossed through the flame but rather was about 3 cm away directly above the tip of flame. No ignition was observed throughout the test.

Comparative Example D

Comparative Example D was carried out in the same manner as Example 69, except that the electrolyte composition was prepared by dissolving 1 mole of LiBETI in 1L of a solvent mixture containing EC and DEC at 30/70 volume ratio. Ignition was observed during the first pass through the flame, and continuous flaming occurred even after the glass filter was removed from the flame.

Examples 70-76 And Comparative Examples E And F

Examples 70-76 were carried out to determine the surface tension of the electrolyte compositions of the present invention in comparison to the surface tension of the electrolyte compositions of Comparative Examples E and F. The samples for each example were prepared by dissolving 1 mole of LiBETI in 1 L of solvent mixture containing varying proportions of EC, DEC, EMC, and HFE. Then the surface tension of the electrolyte composition was measured at 25° C.

Table II below summarizes the surface tension as well as the proportions of the various components present in the solvent mixture for each of Examples 70-76 and Comparative Examples E and F.

TABLE II

| Example Number | Solvent Composition | | | | Surface Tension (Dyne/cm) |
| --- | --- | --- | --- | --- | --- |
|  | EC(L) | EMC(L) | DEC(L) | HFE(L) |  |
| Example 70 | 0.05 | 0.85 |  | 0.1 | 25.5 |
| Example 71 | 0.05 | 0.65 |  | 0.3 | 22.9 |
| Example 72 | 0.05 | 0.45 |  | 0.5 | 21.3 |
| Example 73 | 0.05 | 0.25 |  | 0.7 | 19.7 |
| Example 74 | 0.3 | 0.6 |  | 0.1 | 26.7 |
| Example 75 | 0.3 | 0.4 |  | 0.3 | 23.4 |
| Example 76 | 0.3 | 0.2 |  | 0.5 | 20.5 |
| Comparative Example E | 0.05 |  | 0.95 | 0 | 28.0 |
| Comparative Example F | 0.3 |  | 0.7 | 0 | 31.0 |

As seen in Table II, the examples with the electrolyte composition of the invention have lower surface tension than electrolyte compositions of comparative examples which do not contain any HFE. A lower surface tension for the electrolyte composition is believed to be preferred due to easier and quicker assembly, as an electrolyte composition with a lower surface tension enters into the cell package more smoothly, penetrates the micropores of separator quickly, and coats the electrodes.

Example 77

A clear and uniform solution of $TEABF_4$ (0.1 mole/L) in a solvent mixture containing gamma-butyrolactone (GBL) and HFE at 1/1 volume ratio was prepared. The resulting solution was filled in to a three electrode cell under dry argon atmosphere with a dew point less than −90° C., and cyclic voltammetry analysis was conducted with 10 mV/sec. of potential sweep rate using automatic polarization system (HZ-3000, Hokuto Denko Co., Tokyo, Japan). The working electrode was glassy carbon, counter electrode was platinum wire and reference electrode was lithium. Following this test, a solution with small amount of ferrocene dissolved in GBL was added to the above solution to result in a final ferrocene concentration of 0.01 mol/L. Then a second cyclic voltammetry was conducted (under the same conditions) on the resulting solution. The current from redox of ferrocene was observed around 3.62V (vs.Li/Li+). Because calculated redox potential of ferrocene based on known data in past literatures was 3.31V (vs.Li/Li+), it was confirmed that lithium reference electrode in this test was rather reasonable and the potential window observed in attached FIG. 1 was appropriate.

Comparative Example G

Comparative Example G was run in the same manner as Example 77, except that the solvent mixture used to dissolve TEABF$_4$ contained GBL only.

Voltammograms for Example 77 and Comparative Example G are shown in FIG. 1. A comparison of the voltammograms for Example 77 and Comparative Example G it is concluded that the electrolyte composition of Example 77 according to this invention, more specifically the HFE, has at least the same level of antioxidant characteristics as GBL, which did not oxidize until around 8.5v (vs. Li/Li$^+$). A small oxidation current observed around 6.0V (vs.Li/Li$^+$) is observed in the voltammogram of both Example 77 and Comparative Example G therefore it is believed that this small current is from GBL itself or any unknown impurities included in GBL, not from HFE. Therefore it is believed that the electrolyte compositions of the invention are suitable (stable with less electrochemical decomposition of solvent) for applications where the maximum voltage for charging devices are higher, for instance when Li-ion battery is charged over 4.2V.

Examples 78-80 And Comparative Examples H, I And J

Examples 78-80 were carried out to determine the lithium ion deposition/dissolution efficiency of coin type, two-electrode cells using electrolyte compositions according to this invention in comparison to those of Comparative Examples H, I and J. The coin type two-electrode cells were assembled using nickel substrate as working electrode, lithium as the counter electrode, polypropylene microporous film as a separator and an specific electrolyte composition for each of Examples 78-80 and Comparative Examples H, I, and J. For each cell, initially lithium was electrochemically deposited on the nickel substrate with 0.1 mA/cm$^2$ of constant current density for 3 hours, followed by a 10 minutes break. Then lithium on the nickel substrate was electrochemically dissolved with 0.1 mA/cm$^2$ of constant current density until cell potential was 1.5V, at which point another 10 minutes break was added. Defining this lithium deposition/dissolution process as one cycle, the test was repeated for 40 cycles. All cycles were conducted at 25° C. The counter electrode contained more than 30 mg of lithium, which is equivalent to more than 110mAh of capacity so that, the amount of lithium was sufficient for this test. Cycle efficiency was calculated using the following equation:

Lithium deposition/dissolution efficiency (%)= [(Quantity of electricity at lithium dissolution (mAh))/(Quantity of electricity at lithium deposition (mAh))]×100

Table IIIa below summarizes the electrolyte compositions (i.e, the type of supporting salt and the solvent mixture) and Table IIIb below summarizes the lithium deposition/dissolution efficiency for of the corresponding coin type, two electrode cells for each of Examples 78-80 and Comparative Examples H, I, and J. In all examples and comparative examples electrolyte compositions were prepared by dissolving 1 mole of supporting salt in 1 L of corresponding solvent mixture.

TABLE IIIa

| Example Number | Supporting salt | Solvent mixture (volume ratio) |
|---|---|---|
| Example 78 | LiBETI | EC/DEC/HFE (1/1/1) |
| Comparative Example H | LiBETI | EC/DEC (1/2) |
| Example 79 | LiTFM | EC/DEC/HFE (1/1/1) |
| Comparative Example I | LiTFM | EC/DEC (1/2) |
| Example 80 | LiPF6 | EC/DEC/HFE (1/1/1) |
| Comparative Example J | LiPF6 | EC/DEC (1/2) |

TABLE III b

| Example Number | Lithium deposition/dissolution efficiency/% | | | | |
|---|---|---|---|---|---|
| | Cycle 1 | Cycle 10 | Cycle 20 | Cycle 30 | Cycle 40 |
| Example 78 | 91.2 | 96.8 | 95.8 | 96.2 | 94.9 |
| Comparative Example H | 90.2 | 93.6 | 90.7 | 88.5 | 88.4 |
| Example 79 | 89.4 | 95.6 | 95.6 | 95.0 | 95.2 |
| Comparative example I | 89.9 | 92.3 | 90.5 | 88.4 | 87.0 |
| Example 80 | 88.4 | 94.8 | 92.7 | 91.2 | 91.6 |
| Comparative example J | 87.7 | 91.5 | 86.7 | 84.3 | 83.1 |

Example 81 And Comparative Examples K, L, And M

Example 81 was carried out to determine the discharge rate performance of a battery prepared using the electrolyte composition according to the invention at a maximum charge voltage of 4.2V in comparison to the performance of batteries using electrolyte compositions of Comparative Examples K, L, and M.

For Example 81, a coin cell containing positive and negative electrodes, polypropylene microporous separator film and an electrolyte composition, was assembled. The positive electrode was prepared by coating a slurry containing lithium cobalt oxide as active material, acetylene black as conductive material, polyvinylidenefluoride as binder and N-methyl-2-pyrrolidone as coating solvent on an aluminum foil, drying the coating and punching a circle of appropriate size. The negative electrode was prepared by coating a slurry containing methophasecarbon microbeads as active material, graphite as conductive material, polyvinylidenefluoride as binder and N-methyl-2-pyrrolidone as coating solvent on a copper foil, drying the coating and punching a circle of appropriate size. To insure that the cell capacity was governed by the weight of lithium cobalt oxide on the positive electrode, the active material weight on the positive electrode was adjusted so that its calculated theoretical capacity was slightly smaller than the negative electrode. The electrolyte composition was prepared by dissolving 1 mol of $LiPF_6$ in 1 L of a solvent mixture containing EC/DC/HFE at 5/45/50 volume ratio.

In order to stabilize the cell, three charge/discharge cycles were run at 25° C. Each cycle consisted of charging the cell until 4.2V with 0.2CmA of constant current, and then discharging until 2.5V with 0.2 mA of constant current. Between charge and discharge, 10 minutes open circuit break was added. To confirm the cell worked with stable charge/discharge capacity, ten charge/discharge cycles were carried out at 25° C. During each cycle, the cell was charged 0.5CmA of constant current until 4.2V, then continuously charging with 4.2V of constant voltage. Charging was terminated when total charging time reached to 3 hours or current decayed to 0.01CmA. Following ten minutes of open circuit break time, the cell was discharged with 0.5CmA of constant current until 2.5V, with a ten minutes of open circuit break. The cell confirmed stable by the above process was then once again charged and was discharged with 0.2CmA, 1CmA, 3CmA, 9CmA or 12CmA of constant current until cell voltage reached to 2.5V, and cell capacity at each discharge rate was measured. For Example 81 cell discharge capacity at 0.2CmA current was over 129mAh per 1 g of lithium cobalt oxide in a cell (Theoretical cell capacity was calculated based on the weight of lithium cobalt oxide in a coin cell, and was defined as CmAh). Defining discharge capacity at 0.2CmA as 100%, correlation between discharge rate and obtained discharge capacity is plotted in FIG. 2.

Coin type cells of Comparative Examples K, L, and M were prepared, stabilized, confirmed stable and tested in the same manner as the Example 81 cell, except that the solvent mixture used for preparing the electrolyte compositions contained EC/DEC at 1/1 volume ratio for Comparative Example K, EC/DEC at 5/95 volume ratio for Comparative Example L, and EC/DEC/DMC at 5/45/59 volume ratio for Comparative Example M, respectively. The discharge capacity for cells of Comparative Examples K, L, and M are plotted in FIG. 2.

Figure 2:
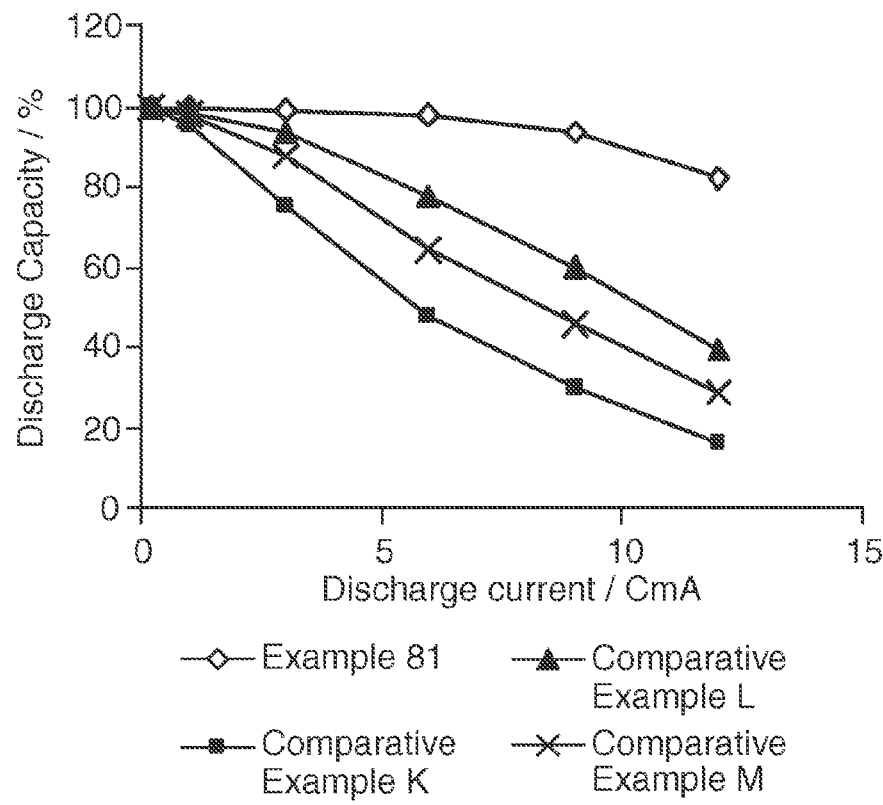
FIG. 2 is a plot of discharge capacity vs. discharge current for Example 81 and Comparative Examples K, L, and M.

As shown in FIG. 2, it is obvious that measured capacity of the Example 81 cell including electrolyte composition of this invention, is higher than those of comparative Example cells, especially at higher discharge current conditions.

Next, the test cell of Example 81 was reused to test it for charge rate performance of battery in which maximum charge voltage is 4.2V. Prior to this testing the charge/discharge stability and capacity of the cell was reconfirmed by the same process described above except that only eight charge/discharge cycles were completed. Charge and discharge capacity of this eighth cycle were over 127mAh (per 1 g of lithium cobalt oxide in a cell), and it was confirmed the cell worked well. Charge capacity of this eighth cycle, i.e. total charge capacity of two charging steps (i.e., the sum of constant current charging and the constant voltage charging) was defined as 100%. Then the cell was charged by 0.5CmA, 1CmA, 3CmA or 6CmA of constant current until cell voltage reached to 4.2V. In this case, constant voltage charging was not added.

Figure 3:
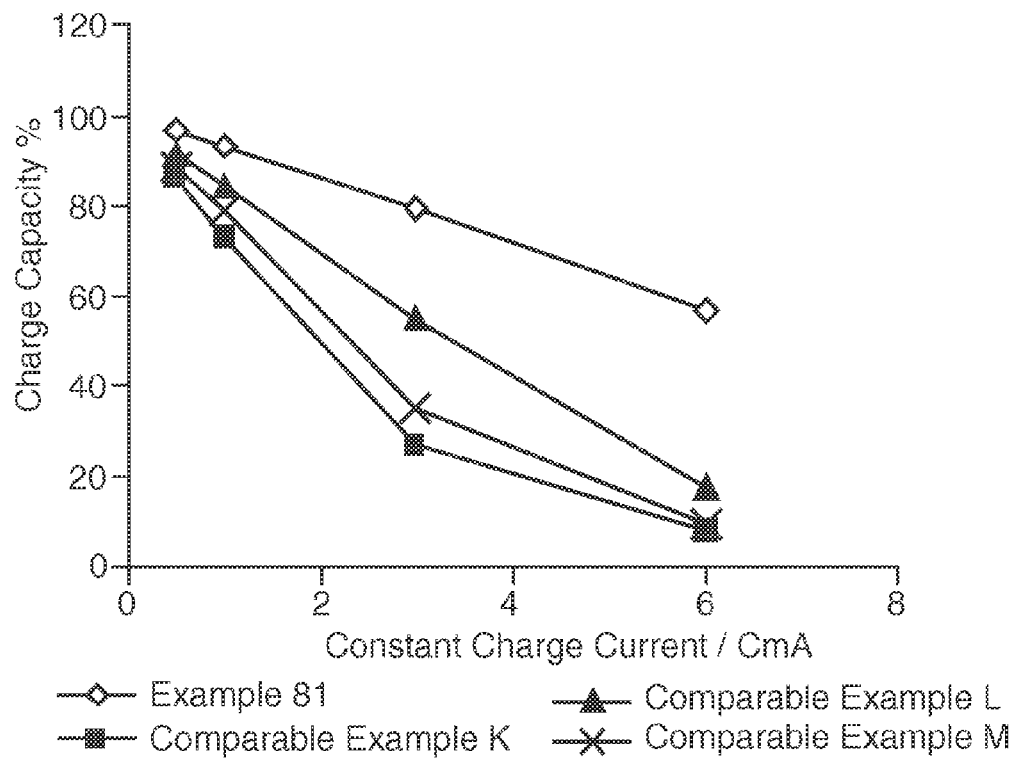
FIG. 3 is a plot of charge capacity vs. constant charge current for Example 81 and Comparative Examples K, L, and M.

Similarly the test cells of Comparative Examples K, L and M were retested for charge rate performance of battery in which maximum charge voltage is 4.2V. The test process was the same as that used for retesting of the Example 81 cell. Correlation between charge rate and obtained charge capacity of Example 81 and Comparative Examples K, L, and M cells are plotted in FIG. 3.

The charge capacity of the cell of Example 81, including electrolyte composition of this invention at constant current charging, is higher than the cells of comparative examples K, L, and M higher charge current condition.

The test cell of Example 81 cell was further tested for its low temperature discharge performance of battery in which maximum charge voltage is 4.2V. Prior to this testing the charge/discharge stability and capacity of the cell was reconfirmed by the same process described above and it was confirmed that the cell worked well without any problems. The final discharge capacity in this step at 25° C. was defined as 100%.

Next, the coin cell was once again charged in the same manner as above and then discharged at 10, 0, −10 or −20° C. of atmospheric temperature until cell voltage reached to 2.5V. The capacity at each temperature was measured. During the test even though the temperature of discharge was varied at each test, the charging temperature was the same, i.e., 25° C.

Similarly the test cells of Comparative Examples K, L and M were further tested for low temperature discharge performance of battery in which maximum charge voltage is 4.2V. The test process was the same as that used for further testing of the Example 81 cell. Correlation between discharge temperature and obtained discharge capacity is plotted and obtained discharge capacity of Example 81 and Comparative Examples K, L, and M cells are plotted in FIG. 4.

Figure 4:
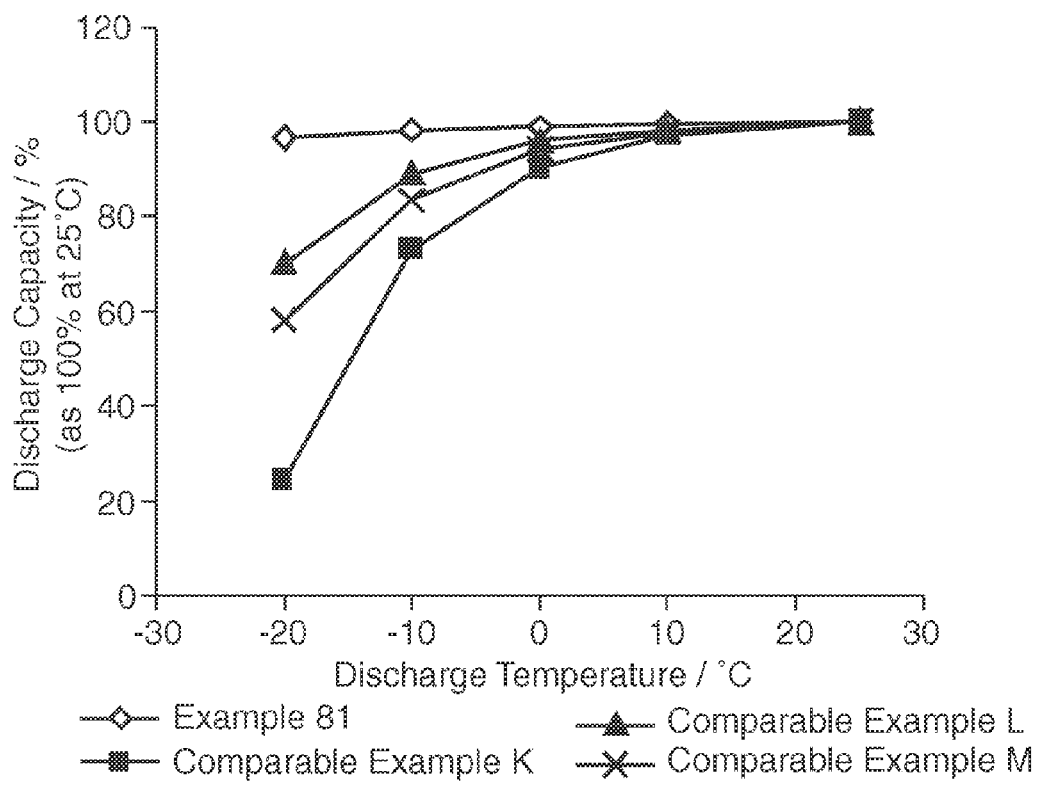
FIG. 4 is a plot of discharge capacity vs. discharge temperature for Example 81 and Comparative Examples K, L, and M.

It is obvious from FIG. 4 that the cell of Example 81, including electrolyte compound of this invention has superior discharge capacity to the cells of comparative examples at low temperature. In addition, the cell of Example 81 had over 90% of discharge capacity even at very low temperature, −10 or −20° C., comparing to the discharge capacity at room temperature, 25° C. It means that an electric appliance including a device of this invention is useful even at low temperature, wherein operation time, e.g. continuous calling time of cellular phone, at low temperature is not shortened from the one at room temperature.

Example 82

For Example 82, a coin cell containing positive and negative electrodes, polypropylene microporous separator film and an electrolyte composition, was assembled as described in Example 81, except that the cathode active material was $Li_{1.08}Ni_{0.38}Co_{0.16}Mn_{0.38}O_2$ (one of a class of useful materials $Li_aNi_bCo_cMn_dO_2$, wherein $0.8<a<1.2$, $0<b<1$, $0<c<1$, and $0<d<1$) and electrolyte compound was a solution of 1 mol of $LiPF_6$ and 1 L of solvent mixture EC/EMC/HFE at 5/45/50 volume ratio. Theoretical cell capacity was calculated based on the weight of $Li_{1.08}Ni_{0.38}Co_{0.16}Mn_{0.38}O_2$ in a cell, and was defined as CmAh. At 25° C., the cell was first charged with 0.5CmA of constant current until 4.4V, then continuously charged with 4.4V of constant voltage. Charging was terminated when total charging time reached three hours or current decayed to 0.05CmA., after which a 10 minutes of open circuit break time was given. Then the cell was discharged with 0.5CmA of constant current until 3.0V, with a 10-minute open circuit break time. This charge/discharge cycle was repeated 30 times, and it was confirmed that cell worked with stable charge/discharge capacity. Discharge capacity at 30th cycle here was 150mAh/g per 1 g of $Li_{1.08}Ni_{0.38}Co_{0.16}Mn_{0.38}O_2$.

Figure 5:
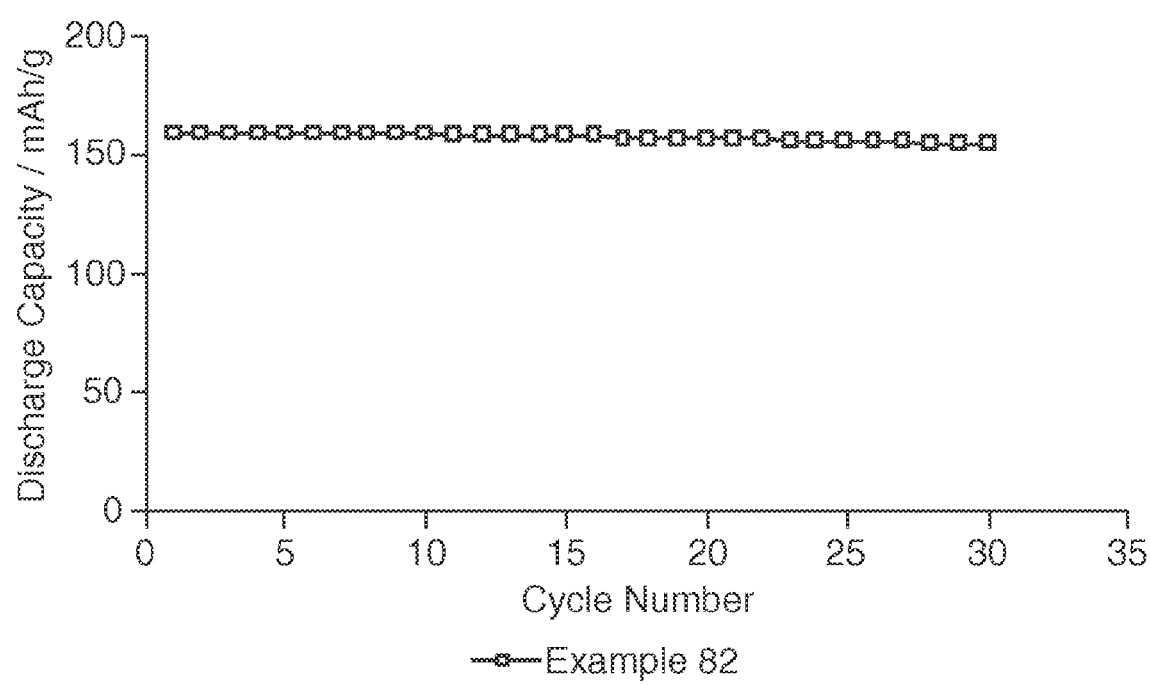
FIG. 5 is a plot of discharge capacity and cycle number for Example 82.

Then, the cell was charged again to 4.5V and the cell was tested using the above charge/discharge cycle for an additional 30 times at 4.5V. Correlation between cycle number and discharge capacity, 30 cycles of maximum 4.5V, is shown in FIG. 5.

Example 83 And Comparative Examples N And P

Example 83 was run to determine the internal impedance of a battery made using electrolyte composition of this invention at a maximum charge voltage of over 4.2V and to compare it to the internal impedance of batteries made according to Comparative Examples N and P.

For Example 83, a coin type cell similar to that of Example 82 was assembled. The cell was subjected to ten charge/discharge cycles at a maximum charging voltage of 4.4V. Then ten additional charge/discharge cycles were carried out at maximum charging voltages of 4.5 and 4.6 V, respectively for a total of thirty charging/discharging cycles (10 charge/discharge cycles at each maximum charging voltages of 4.4, 4.5, and 4.6V ). The cell was then charged once again at a maximum charging voltage of 4.6V at 25° C., the circuit was opened and AC impedance of coin cell was measured using an automatic polarization system HZ-3000 (Hokuto Denko Co., Tokyo, Japan) and a frequency response analyzer 5020 (NF Co., Yokohama, Japan). The real impedance value for the cell was determined by applying curve fitting technique from the diameter of cole-cole plot semicircle. In case cole-cole plot had two or more semicircles, largest one observed at lower frequency side was used for cell impedance calculation. The impedance of the coin cell of Example 83 cell was 130 ohm. Then, the same coin cell was kept at 4.6V constant voltage charging state totally 40 hrs, and the impedance was recalculated using the above method, which was 245 ohm. Finally, a third impedance measurement was made after a total of 140 hrs constant voltage charging was conducted, with a final impedance value of 401 ohm.

Similar coin type cells for Comparative Examples N and P were prepared and tested in the same manner as Example 83 cells, except that the electrolyte solvent mixture for cells of Comparative Examples N and P contained EC/EMC at 50/50 and 5/95 volume ratios, respectively. Table IV below summarizes the internal impedances of cells for each of Example 83 and Comparative Examples N and P.

TABLE IV

| Example Number | Impedance/ohm (Before 4.6 V - 40 hrs constant voltage charging) | Impedance/ohm (After 4.6 V - 40 hrs constant voltage charging) | Impedance/ohm (After 4.6 V - 140 hrs constant voltage charging) |
|---|---|---|---|
| Example 83 | 130 | 245 | 401 |
| Comparative Example N | 436 | 750 | 2650 |
| Comparative Example P | 304 | 635 | 1190 |

As seen in Table IV, not only the cell including electrolyte composition of this invention had lower impedance initially, but also impedance increased less even after long time constant voltage charging, a condition known as trickle charging, was added. In addition, in this example, $Li_{1.08}Ni_{0.38}Co_{0.16}Mn_{0.38}O_2$ was utilized as a cathode and simultaneously maximum charging voltage was set as 4.6V so as to show the controllability of the cell impedance of cells made according to this invention was very effective even in the case of high voltage type lithium ion battery.

Furthermore, the impedance values of the Example 83 and Comparative Examples N and P here should be considered as relative results, not as absolute values. Generally cell impedance is determined by various factors, for example, particle shape of electrode active material, method to prepare coating or non-coating electrode, method of cell assembling, distance and facing area between two electrodes and cell shape like cylindrical, prismatic, thin laminated, coin or others. Therefore, even though any third party may try to make cells using the completely same electrolyte formulation with this example, the same absolute impedance value will not necessarily be obtained if, for example, their cell shape is different. However, if the only difference is the electrolyte formulation with all other conditions being the same, it is possible to observe similar relative values of impedances.

The referenced descriptions contained in the patents, patent documents, and publications cited herein are incorporated by reference in their entirety as if each were individually incorporated. Various unforeseeable modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only, with the scope of the invention intended to be limited only by the claims set forth herein as follows:

We claim:
1. A composition comprising
(a) a solvent composition comprising at least one hydrofluoroether compound consisting of two terminal fluoroalkyl groups and an intervening oxymethylene group, each of said fluoroalkyl groups having only one hydrogen atom and, optionally, at least one catenated heteroatom, and said oxymethylene group being unsubstituted or being substituted by having at least one carbon-bonded hydrogen atom replaced with an alkyl or fluoroalkyl group that optionally contains at least one catenated heteroatom with the proviso that said hydrogen atom is part of a monofluoromethylene moiety; wherein said compound is one of a class that is represented by the following general formula (I):

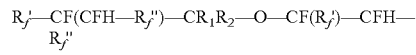

wherein each $R_f'$ is independently a fluorine atom or a perfluoroalkyl group that is linear, branched, cyclic, or a combination thereof and that optionally contains at least one catenated heteroatom; each $R_f''$ is independently a perfluoroalkyl group that is linear, branched, cyclic, or a combination thereof and that optionally contains at least one catenated heteroatom, and $R_1$ and $R_2$ are independently a hydrogen atom, an alkyl group that is linear, branched, cyclic, or a combination thereof and that optionally contains at least one catenated heteroatom, or a fluoroalkyl group that is linear, branched, cyclic, or a combination thereof and that optionally contains at least one catenated heteroatom; and
(b) at least one electrolyte salt.

2. The composition of claim 1, wherein said oxymethylene group is substituted.

3. The composition of claim 2, wherein at least one carbon-bonded hydrogen atom of said oxymethylene group is replaced with an alkyl group that optionally contains at least one catenated heteroatom.

4. The composition of claim 2, wherein at least one carbon-bonded hydrogen atom of said oxymethylene group is replaced with a fluoroalkyl group that optionally contains at least one catenated heteroatom.

5. The composition of claim 1, wherein said hydrogen atom of said fluoroalkyl groups is part of a monofluoromethylene moiety.

6. The composition of claim 1, wherein said $R_1$ is hydrogen or an alkyl group that is linear, branched, cyclic, or a combination thereof; and said $R_2$ is hydrogen or an alkyl group that is linear, branched, cyclic, or a combination thereof, or is —$(CR_1R_3)_n$—O—$CF(R_f')$—CFH—$R_f''$, wherein $R_3$ is hydrogen or an alkyl group that is linear, branched, cyclic, or a combination thereof, or is —$CF(R_f')$—CFH—$R_f''$ and n is an integer of 1 to about 8.

7. The composition of claim 1, wherein said $R_2$ is an alkyl group that is linear, branched, cyclic, or a combination thereof.

8. The composition of claim 1, wherein said compound is one of a class that is represented by the following general formula (II):

$$H(CF_2)_p—CR_1R_2—O—CF(R_f')—CFH—R_f'\qquad(II)$$

wherein p is an integer of 2 to about 10; $R_1$ and $R_2$ are independently a hydrogen atom, an alkyl group that is linear, branched, cyclic, or a combination thereof and that optionally contains at least one catenated heteroatom, or a fluoroalkyl group that is linear, branched, cyclic, or a combination thereof and that optionally contains at least one catenated heteroatom; and $R_f'$ is a fluorine atom or a perfluoroalkyl group that is linear, branched, cyclic, or a combination thereof and that optionally contains at least one catenated heteroatom.

9. The composition of claim 8, wherein said $R_1$ is hydrogen or an alkyl group that is linear, branched, cyclic, or a combination thereof; and said $R_2$ is hydrogen or an alkyl group that is linear, branched, cyclic, or a combination thereof, or is —$(CR_1R_3)_n$—O—$CF(R_f')$—CFH—$R_f''$, wherein $R_3$ is hydrogen or an alkyl group that is linear, branched, cyclic, or a combination thereof, or is —$CF(R_f')$—CFH—$R_f''$, and n is an integer of 1 to about 8.

10. The composition of claim 9, wherein said $R_2$ is an alkyl group that is linear, branched, cyclic, or a combination thereof.

11. The composition of claim 1, wherein said compound is selected from the group consisting of
$CF_3CFHCF_2CH_2OCF_2CFHOC_3F_7$,
$CF_3CFHCF_2CH_2OCF_2CFHOC_3F_6OCF_3$,
$CF_3CFHCF_2CH_2OCF_2CFHOCF_3$,
$CF_3CFHCF_2CH_2OCF_2CFHOCF_2CF(CF_3)OC_3F_7$,
$CF_3CFHCF_2CH_2OCF_2CFHOC_4F_9$,
$CF_3CFHCF_2CH_2OCF_2CFHC_3F_7$,
$CF_3CF(CH_2OCF_2CFHCF_3)CFHCF(CF_3)_2$, $CF_3CFHCF(CH_2OCF_2CFHCF_3)CF(CF_3)_2$, $CF_3CF(CH_2OCF_2CFHCF_3)CFHCF_2CF_3$, $CF_3CF_2CF(CH_2OCF_2CFHCF_3)CFHCF_3$, $CF_3CFHCF_2CH_2OCF(CF_3)CFHC_2F_5$,
$CF_3CFHCF_2CH(CH_3)OCF_2CFHCF_3$, $CF_3CFHCF_2CH(CH_3)OCF_2CFHOC_3F_7$, $CF_3CFHCF_2CH(CH_3)OCF_2CFHOC_3F_6OCF_3$, $CF_3CFHCF_2CH(CH_3)OCF_2CFHOCF_3$, $CF_3CFHCF_2CH(CH_3)OCF_2CFHOCF_2CF(CF_3)OC_3F_7$,
$CF_3CFHCF_2CH(CH_3)OCF_2CFHOC_4F_9$, $CF_3CFHCF_2CH(CH_3)OCF_2CFHC_3F_7$, $CF_3CF[CH(CH_3)OCF_2CFHCF_3]CFHCF(CF_3)_2$, $CF_3CFH[CH(CH_3)OCF_2CFHCF_3]CFCF(CF_3)_2$,
$CF_3CF[CH(CH_3)OCF_2CFHCF_3]CFHCF_2CF_3$, $CF_3CF_2CF[CH(CH_3)OCF_2CFHCF_3]CFHCF_3$, $CF_3CFHCF_2CH(CH_3)OCF(CF_3)CFHC_2F_5$,
$CF_3CFHCF_2C(CH_3)_2OCF_2CFHCF_3$, $CF_3CFHCF_2C(CH_3)_2OCF_2CFHOC_3F_7$, $CF_3CFHCF_2C(CH_3)_2OCF_2CFHOC_3F_6OCF_3$, $CF_3CFHCF_2C(CH_3)_2$ 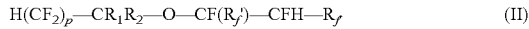
$OCF_2CFHOCF_3$, $CF_3CFHCF_2C(CH_3)_2OCF_2CFHOCF_2CF(CF_3)OC_3F_7$, $CF_3CFHCF_2CH(CH_3)_2OCF_2CFHOC_4F_9$, $CF_3CFHCF_2CH(CH_3)_2OCF_2CFHC_3F_7$, $CF_3CF[C(CH_3)_2OCF_2CFHCF_3]CFHCF_2CF_3$, $CF_3CF_2CF[C(CH_3)_2OCF_2CFHCF_3]CFHCF_3$,
$C_3F_7OCFHCF_2CH_2OCF_2CFHCF_3$,
$C_3F_7OCFHCF_2CH_2OCF_2CFHOC_3F_7$,
$C_3F_7OCFHCF_2CH_2OCF_2CFHOC_3F_6OCF_3$,
$CF_3F_7OCFHCF_2CH_2OCF_2CFHOCF_3$,
$C_3F_7OCFHCF_2CH_2OCF_2CFHOCF_2CF(CF_3)OC_3F_7$,
$C_3F_7OCFHCF_2CH_2OCF_2CFHOC_4F_9$,
$C_3F_7OCFHCF_2CH_2OCF_2CFHC_3F_7$, $CF_3CF(CH_2OCF_2CFHOC_3F_7)CFHCF(CF_3)_2$,
$CF_3CF(CH_2OCF_2CFHOC_3F_7)CFHCF_2CF_3$, $CF_3CF_2CF(CH_2OCF_2CFHOC_3F_7)CFHCF_3$, $C_3F_7OCFHCF_2CH(CH_3)OCF_2CFHCF_3$, $C_3F_7OCFHCF_2CH(CH_3)OCF_2CFHOC_3F_7$, $C_3F_7OCFHCF_2CH(CH_3)OCF_2CFHOC_3F_6OCF_3$, $C_3F_7OCFHCF_2CH(CH_3)OCF_2CFHOCF_3$,
$C_3F_7OCFHCF_2CH(CH_3)OCF_2CFHOCF_2CF(CF_3)OC_3F_7$,
$C_3F_7OCFHCF_2CH(CH_3)OCF_2CFHOC_4F_9$,
$C_3F_7OCFHCF_2CH(CH_3)OCF_2CFHC_3F_7$, $CF_3CF(CH(CH_3)OCF_2CFHOC_3F_7)CFHCF(CF_3)_2$,
$CF_3CF(CH(CH_3)OCF_2CFHOC_3F_7)CFHCF_2CF_3$, $CF_3CF_2CF(CH(CH_3)OCF_2CFHOC_3F_7)CFHCF_3$, $C_3F_7OCFHCF_2C(CH_3)_2OCF_2CFHCF_3$, $C_3F_7OCFHCF_2C(CH_3)_2OCF_2CFHOC_3F_7$,
$C_3F_7OCFHCF_2C(CH_3)_2OCF_2CFHOC_3F_6OCF_3$, $C_3F_7OCFHCF_2C(CH_3)_2OCF_2CFHOCF_3$, $C_3F_7OCFHCF_2C(CH_3)_2OCF_2CFHOCF_2CF(CF_3)OC_3F_7$,
$C_3F_7OCFHCF_2C(CH_3)_2OCF_2CFHOC_4F_9$, $C_3F_7OCFHCF_2C(CH_3)_2OCF_2CFHC_3F_7$, $CF_3CF(C(CH_3)_2OCF_2CFHOC_3F_7)CFHCF(CF_3)_2$,
$CF_3CF(C(CH_3)_2OCF_2CFHOC_3F_7)CFHCF_2CF_3$, $CF_3CF_2CF(C(CH_3)_2OCF_2CFHOC_3F_7)CFHCF_3$, $CF_3CFHCF_2CH(OCF_2CFHCF_3)CH_2OCF_2CFHCF_3$, $CF_3OCF(CF_3)CF_2OCFHCF_2C(CH_3)_2OCF_2CFHCF_3$, $[CF_3CFHCF_2OCH(CF_2CFHCF_3)]_2CH_2$,
$CF_3CFHCF_2OCH_2CH_2CH(CF_2CFHCF_3)OCF_2CFHCF_3$,
$C_4F_9CH_2CH(CF_2CFHCF_3)OCF_2CFHCF_3$, $CH_3C(OCF_2CFHCF_3)(CF_2CFHCF_3)CH_2OCF_2CFHCF_3$, $CH_3CH(OCF_2CFHCF_3)CH(OCF_2CFHCF_3)CF_2CFHCF_3$,

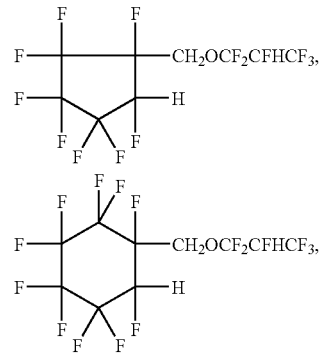

and
$CF_3CFHCF_2CH(CH_3)OCF_2CF_2H$, and mixtures thereof.

12. The composition of claim 1, wherein said compound is selected from the group consisting of
CF$_3$CFHCF$_2$CH(CH$_3$)OCF$_2$CFHCF$_3$,
CF$_3$CFHCF$_2$CH$_2$OCF$_2$CFHOC$_4$F$_9$,
C$_3$F$_7$OCFHCF$_2$CH(CH$_3$)OCF$_2$CFHCF$_3$, CF$_3$CFH[CH(CH$_3$)OCF$_2$CFHCF$_3$]CFCF(CF$_3$)$_2$, CF$_3$CFHCF$_2$CH(OCF$_2$CFHCF$_3$)CH$_2$OCF$_2$CFHCF$_3$,
CF$_3$CFHCF$_2$CH$_2$OCF$_2$CFHOC$_3$F$_7$,
CF$_3$CFHCF$_2$CH$_2$OCF$_2$CFHOCF$_3$, CF$_3$CF(CH$_2$OCF$_2$CFHCF$_3$)CFHCF(CF$_3$)$_2$,
CF$_3$CFHCF(CH$_2$OCF$_2$CFHCF$_3$)CF(CF$_3$)$_2$,
CF$_3$CFHCF$_2$CH(CH$_3$)OCF$_2$CFHOC$_3$F$_7$, CF$_3$CF[CH(CH$_3$)OCF$_2$CFHCF$_3$]CFHCF(CF$_3$)$_2$, CF$_3$CF[CH(CH$_3$)OCF$_2$CFHCF$_3$]CFHCF$_2$CF$_3$,
CF$_3$CF$_2$CF[CH(CH$_3$)OCF$_2$CFHCF$_3$]CFHCF$_3$,
CF$_3$CFHCF$_2$C(CH$_3$)$_2$OCF$_2$CFHCF$_3$,
CF$_3$CFHCF$_2$C(CH$_3$)$_2$OCF$_2$CFHOC$_3$F$_7$,
C$_3$F$_7$OCFHCF$_2$CH$_2$OCF$_2$CFHCF$_3$, CF$_3$OCF(CF$_3$)CF$_2$OCFHCF$_2$C(CH$_3$)$_2$OCF$_2$CFHCF$_3$,
CF$_3$CFHCF$_2$OCH$_2$CH$_2$CH(CF$_2$CFHCF$_3$)OCF$_2$CFHCF$_3$, and mixtures thereof.

13. The composition of claim 1, wherein said solvent composition further comprises at least one organic or fluorine-containing electrolyte solvent that is different from said at least one hydrofluoroether compound.

14. The composition of claim 13, wherein the at least one organic or fluorine-containing electrolyte solvent is selected from the group consisting of propylene carbonate, ethylene carbonate, dimethyl carbonate, diethyl carbonate, ethyl methyl carbonate, dimethoxyethane, γ-butyrolactone, diglyme, tetraglyme, tetrahydrofuran, alkyl-substituted tetrahydrofuran, 1,3-dioxolane, alkyl-substituted 1,3-dioxolane, monofluoroethylene carbonate, tetrahydropyran, alkyl-substituted tetrahydropyran, and mixtures thereof.

15. The composition of claim 14, wherein the solvent composition comprises more than zero and up to 80 vol % of the at least one organic or fluorine containing electrolyte solvent.

16. The composition of claim 14, wherein the solvent composition comprises 10 vol % to 80 vol % of the at least one organic or fluorine containing electrolyte solvent.

17. The composition of claim 16, wherein the at least one organic or fluorine containing electrolyte solvent is selected from the group consisting of propylene carbonate, ethylene carbonate, dimethyl carbonate, diethyl carbonate, ethyl methyl carbonate, and mixtures thereof.

18. The composition of claim 15, wherein the composition comprises 0.1 to 2.0 mol/L of an inorganic electrolyte salt.

19. The composition of claim 16, wherein the composition comprises 0.1 to 2.0 mol/L of an inorganic electrolyte salt.

20. The composition of claim 1, wherein said electrolyte salt comprises at least one cation and at least one weakly coordinating anion.

21. The composition of claim 20, wherein said cation is selected from hydrogen, alkali metal, alkaline earth metal, Group IIB metal, Group IIIB metal, transition metal, rare earth metal, and ammonium cations.

22. The composition of claim 21, wherein said cation is selected from alkali metal and alkaline earth metal cations.

23. The composition of claim 1, wherein said electrolyte salt comprises at least one anion selected from fluorine-containing inorganic anions; ClO$_4^-$; HSO$_4^-$; H$_2$PO$_4^-$; alkane, aryl, and alkaryl sulfonates; fluorine-containing and unfluorinated tetraarylborates; carborane anions; halogen-, alkyl-, or haloalkyl-substituted carborane anions; and fluorine-containing organic anions.

24. The composition of claim 23, wherein said anion is selected from fluorine-containing inorganic anions and fluorine-containing organic anions.

25. The composition of claim 1, wherein said electrolyte salt is a lithium salt.

26. A composition comprising
(a) a solvent composition comprising
(i) at least one hydrofluoroether compound consisting of two terminal fluoroalkyl groups and an intervening oxymethylene group, each of said fluoroalkyl groups having only one hydrogen atom and, optionally, at least one catenated heteroatom, and said oxymethylene group being unsubstituted or being substituted by having at least one carbon-bonded hydrogen atom replaced with an alkyl or fluoroalkyl group that optionally contains at least one catenated heteroatom; with the proviso that said hydrogen atom is part of a monofluoromethylene moiety; wherein said compound is one of a class that is represented by the following general formula (I):

R$_f'$—CF(CFH—R$_f''$)—CR$_1$R$_2$—O—CF(R$_f'$)—CFH—R$_f''$ wherein each R$_f'$ is independently a fluorine atom or a perfluoroalkyl group that is linear, branched, cyclic, or a combination thereof and that optionally contains at least one catenated heteroatom; each R$_f''$ is independently a perfluoroalkyl group that is linear, branched, cyclic, or a combination thereof and that optionally contains at least one catenated heteroatom, and R$_1$ and R$_2$ are independently a hydrogen atom, an alkyl group that is linear, branched, cyclic, or a combination thereof and that optionally contains at least one catenated heteroatom, or a fluoroalkyl group that is linear, branched, cyclic, or a combination thereof and that optionally contains at least one catenated heteroatom; and (ii) at least one organic or fluorine-containing electrolyte solvent that is different from said at least one hydrofluoroether compound; and (b) at least one lithium electrolyte salt comprising a fluorine-containing anion.

27. The composition of claim 26, wherein each said R$_f'$ is independently fluorine or C$_3$F$_7$—; each said R$_f''$ is independently selected from C$_3$F$_7$O—, C$_4$F$_9$O—, C$_3$F$_7$OC$_3$F$_6$O—, CF$_3$OC$_3$F$_6$O—, and CF$_3$—; said R$_1$ is hydrogen or methyl; said R$_2$ is methyl; and said R$_f'''$ is selected from fluorine, C$_3$F$_7$O—, C$_4$F$_9$O—, C$_3$F$_7$OC$_3$F$_6$O—, CF$_3$OC$_3$F$_6$O—, and CF$_3$—.

28. A battery comprising a positive electrode, a negative electrode and the composition of claim 1.

29. The battery of claim 28, wherein the positive electrode is a composite oxide comprising lithium and one or more transition metal elements.

30. The battery of claim 28, wherein the negative electrode is selected from the group consisting of carbon materials, lithium, lithium containing alloys and compounds that alloy with lithium.

31. The battery of claim 28, wherein the negative electrode is lithium.

32. The battery of claim 29, wherein lithium species are oxidized or reduced at a potential of 3V or higher vs. Li/Li+.

33. The battery of claim 29, wherein lithium species are oxidized or reduced at a potential of 4.2 to 8.5 V vs. Li/Li+.

34. The battery of claim 32, wherein the cathode is Li$_a$Ni$_b$Co$_c$Mn$_d$O$_2$, and wherein $0.8 \leq a \leq 1.2$, $0 \leq b \leq 1$, $0 \leq c \leq 1$, and $0 \leq d \leq 1$.

35. The battery of claim 32, wherein the anode is selected from the group consisting of carbon materials, lithium, and lithium alloys.

36. The battery of claim 35, wherein the anode is selected from carbon materials and lithium, wherein the carbon materials are selected from the group consisting of graphitized carbon, partially graphitized carbon, or non-graphitized carbon.

37. The battery of claim 28, wherein the battery has a graphitized carbon anode, and wherein the composition has an oxidative stability of up to 8V vs. Li/Li+.

38. The battery of claim 28, wherein the battery has a graphitized carbon anode, and wherein the hydrofluoroether compound in the composition has an oxidative stability of up to 8V vs. Li/Li+.

39. The battery of claim 28, wherein the battery has a graphitized carbon anode, and wherein the composition has an oxidative stability of up to 5V vs. Li/Li+.

40. The battery of claim 28, wherein the battery has a graphitized carbon anode, and wherein the hydrofluoroether compound in the composition has an oxidative stability of up to 5V vs. Li/Li+.

41. The battery of claim 28, wherein the battery has a discharge capacity of greater than 80% at a discharge current of up to 12 CmA.

42. The battery of claim 28, wherein the battery has a discharge capacity of greater than 50% at a discharge current of up to 12 CmA.

43. The battery of claim 28, wherein the battery has a charge capacity of greater than about 60% at a charge current of up to 6 CmA.

44. The battery of claim 28, wherein the battery has a charge capacity of greater than about 40% at a charge current of up to 6 CmA.

45. The battery of claim 28, wherein the battery retains over 90% of its discharge capacity at 25° C. when exposed to ambient temperatures from 0° C. to −20° C.

46. The battery of claim 28, wherein the battery retains a discharge capacity of greater than 150 mAh per gram of cathode over up to 30 charging cycles at up to 4.5 V.

47. An article comprising the battery of claim 28.

* * * * *

UNITED STATES PATENT AND TRADEMARK OFFICE
CERTIFICATE OF CORRECTION

Page 1 of 2

PATENT NO. : 7,790,312 B2
APPLICATION NO. : 11/381862
DATED : September 7, 2010
INVENTOR(S) : Michael G Costello It is certified that error appears in the above-identified patent and that said Letters Patent is hereby corrected as shown below:

Page 2, Column 2,
Line 5, under "Other Publications", delete "Journel" and insert -- Journal --.
Line 25, delete "Ehtyl" and insert -- Ethyl --.

Figures, Sheet 1 of 3,
Line 1, delete "mA/cm2" and insert -- mA/cm$^2$ --.

Column 4,
Line 60, delete "thereof," and insert -- thereof; --.

Column 6,
Line 12, delete "$(CH_3)_2$ $OCF_2CFHOC_4F_9$," and insert -- $CH_3)OCF_2CFHOC_4F_9$, --.

Line 33-29, delete

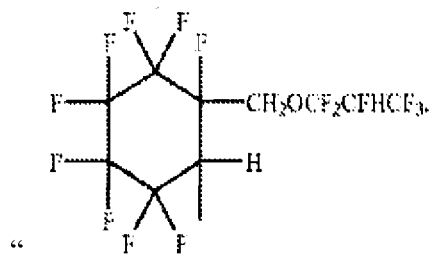

" and insert --

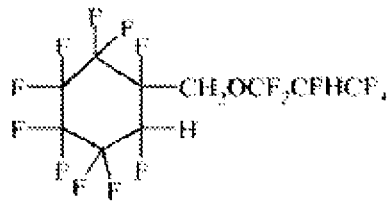

--.

Column 6,
Line 60, delete "thereof," and insert -- thereof; --.

Column 7,
Line 55, delete "$CF_{3OCF=CF2}$," and insert -- $CF_3OCF=CF_2$, --.
Line 67, after "thereof" insert -- . --.

Signed and Sealed this
Twenty-fifth Day of January, 2011

David J. Kappos
*Director of the United States Patent and Trademark Office*

CERTIFICATE OF CORRECTION (continued)
U.S. Pat. No. 7,790,312 B2

Column 8,
Line 5, after "thereof" insert -- . --.
Line 12, after "thereof" insert -- . --.
Line 14, after "thereof" insert -- . --.
Line 23, delete "RfC$_2$H$_4$OH," and insert -- R$_f$C$_2$H$_4$OH, --.
Line 44, delete "C$_g$F$_{17}$CH$_2$CH$_2$CH$_2$OH," and insert -- C$_8$F$_{17}$CH$_2$CH$_2$CH$_2$OH, --.
Line 45, after "thereof" insert -- . --.

Column 9,
Line 37, delete "thereof," and insert -- thereof; --.

Column 13,
Line 2, delete "(Obravoac)" and insert -- (Obrovac) --.

Column 14,
Line 54, delete "Chromatouraphy" and insert -- Chromatography --.

Column 19,
Line 46, delete "C$_3$F$_7$OCFHCF$_2$CH(OCF$_2$CFHCF$_3$)CH3" and insert
-- C$_3$F$_7$OCFHCF$_2$CH(OCF$_2$CFHCF$_3$)CH$_3$ --.

Column 20,
Line 10, delete "CH$_3$CH(OCF2CFHCF3)" and insert -- CH$_3$CH(OCF$_2$CFHCF$_3$) --.

Column 26,
Line 17, delete "IL" and insert -- 1L --.
Line 49, delete "Example76" and insert -- Example 76 --.

Column 32,
Line 38, after "heteroatom" insert -- ; --.

Column 34,
Lines 2-3, delete "CF$_3$CFHCF$_2$CH (CH$_3$)$_2$OCF$_2$CFHOC$_4$F$_9$," and insert
-- CF$_3$CFHCF$_2$C(CH$_3$)$_2$OCF$_2$CFHOC$_4$F$_9$, --.

Line 10, delete "CF$_3$F$_7$OCFHCF$_2$CH$_2$OCF$_2$CFHOCF$_3$," and insert
-- C$_3$F$_7$OCFHCF$_2$CH$_2$OCF$_2$CFHOCF$_3$, --.

Column 36,
Line 25, delete "perfluoroalkvl" and insert -- perfluoroalkyl --.